(12) United States Patent
Waters

(10) Patent No.: US 8,545,012 B2
(45) Date of Patent: Oct. 1, 2013

(54) ILLUMINATED EYEWEAR

(76) Inventor: Michael Waters, Aspen, CO (US)

( * ) Notice: Subject to any disclaimer, the term of this patent is extended or adjusted under 35 U.S.C. 154(b) by 115 days.

(21) Appl. No.: 13/025,100

(22) Filed: Feb. 10, 2011

(65) Prior Publication Data

US 2011/0187989 A1    Aug. 4, 2011

Related U.S. Application Data

(63) Continuation-in-part of application No. 11/941,558, filed on Nov. 16, 2007, which is a continuation-in-part of application No. PCT/US2006/018968, filed on May 17, 2006, application No. 13/025,100, which is a continuation-in-part of application No. 12/895,456, filed on Sep. 30, 2010.

(60) Provisional application No. 60/681,852, filed on May 17, 2005, provisional application No. 60/746,217, filed on May 2, 2006, provisional application No. 61/247,243, filed on Sep. 30, 2009, provisional application No. 61/303,212, filed on Feb. 10, 2010.

(51) Int. Cl.
  *G02C 1/00* (2006.01)
  *F21V 21/084* (2006.01)

(52) U.S. Cl.
  USPC ............................ 351/158; 362/105; 362/106

(58) Field of Classification Search
  USPC ................... 362/106, 105; 351/158
  See application file for complete search history.

(56) References Cited

U.S. PATENT DOCUMENTS

| | | | |
|---|---|---|---|
| 1,261,824 A | 1/1918 | La Vine |
| 1,255,265 A | 2/1918 | Zachara |
| 1,438,586 A | 12/1922 | Eaton |
| 1,448,353 A | 3/1923 | Barany |
| 1,572,210 A | 2/1926 | Kolibas |
| 1,615,067 A | 1/1927 | Boerman |
| 1,663,402 A | 3/1928 | Engel |
| 1,879,512 A | 9/1932 | Rotea |
| 2,196,543 A | 4/1940 | Anderson |

(Continued)

FOREIGN PATENT DOCUMENTS

| CA | 2 466 175 A1 | 5/2003 |
|---|---|---|
| CA | 2608746 A1 | 11/2006 |

(Continued)

OTHER PUBLICATIONS

Notification of Transmittal of the International Search Report and the Written Opinion of the International Searching Authority, or the Declaration from the International Bureau of WIPO for International Application No. PCT/US2011/051596, dated Jan. 18, 2012, 9 pages.

(Continued)

*Primary Examiner* — David J Makiya
(74) *Attorney, Agent, or Firm* — Fitch, Even, Tabin & Flannery, LLP

(57) ABSTRACT

There is provided illuminated eyewear having one or more light sources mounted thereto to project light forwardly thereof. The illuminated eyewear includes a cross-frame member or portion and temple arm members or portions extending rearwardly therefrom in a use configuration. The illuminated eyewear may include a pass-through portion of the cross-frame member that is oriented to be forwardly of the light source to allow light projected from the light source to pass therethrough to an area forwardly of the cross-frame member.

16 Claims, 20 Drawing Sheets

(56) References Cited

U.S. PATENT DOCUMENTS

| | | |
|---|---|---|
| 2,461,254 A | 2/1949 | Bassett |
| 2,531,585 A | 11/1950 | Pope |
| 2,567,046 A | 9/1951 | Anderson |
| 2,591,112 A | 4/1952 | Zwierzynski |
| 2,638,532 A | 5/1953 | Brady |
| 2,904,670 A | 9/1959 | Calmes |
| 2,966,580 A | 12/1960 | Taylor |
| 3,060,308 A | 10/1962 | Fortuna |
| D207,919 S | 6/1967 | Fai |
| 3,350,552 A | 10/1967 | Lawrence |
| D215,751 S | 10/1969 | Castellano |
| 3,602,759 A | 8/1971 | Evans |
| 3,634,676 A | 1/1972 | Castellano |
| 3,647,059 A | 3/1972 | Humphreys |
| 3,683,168 A | 8/1972 | Tatje |
| 3,769,663 A | 11/1973 | Perl |
| D229,975 S | 1/1974 | Klugmann |
| 3,793,517 A | 2/1974 | Carlini |
| 4,210,952 A | 7/1980 | Ressmeyer |
| 4,254,451 A | 3/1981 | Cochran, Jr. |
| 4,283,127 A | 8/1981 | Rosenwinkel et al. |
| 4,332,007 A | 5/1982 | Gibstein et al. |
| 4,406,040 A | 9/1983 | Cannone |
| 4,462,064 A | 7/1984 | Schweitzer |
| 4,516,157 A | 5/1985 | Campbell |
| 4,541,698 A | 9/1985 | Lerner |
| 4,570,206 A | 2/1986 | Deutsch |
| 4,616,297 A | 10/1986 | Liu |
| 4,631,644 A | 12/1986 | Dannhauer |
| 4,774,643 A | 9/1988 | McGinnis et al. |
| 4,822,160 A | 4/1989 | Tsai |
| 4,822,161 A | 4/1989 | Jimmy |
| 4,902,119 A | 2/1990 | Porsche |
| 4,904,078 A | 2/1990 | Gorike |
| 4,959,760 A * | 9/1990 | Wu ............................ 362/105 |
| 4,963,045 A | 10/1990 | Willcox |
| 5,070,436 A | 12/1991 | Alexander et al. |
| 5,113,325 A | 5/1992 | Eisenbraun |
| 5,122,943 A | 6/1992 | Pugh |
| 5,140,220 A | 8/1992 | Hasegawa |
| 5,143,443 A | 9/1992 | Madsen |
| 5,158,356 A | 10/1992 | Guthrie |
| 5,164,749 A | 11/1992 | Shelton |
| 5,183,326 A | 2/1993 | Case |
| 5,189,512 A | 2/1993 | Cameron et al. |
| 5,218,385 A | 6/1993 | Lii |
| 5,230,558 A | 7/1993 | Jong |
| 5,245,516 A | 9/1993 | de Haas et al. |
| D343,470 S | 1/1994 | Yuen |
| 5,278,734 A | 1/1994 | Ferber |
| D349,123 S | 7/1994 | Cooley et al. |
| 5,331,333 A | 7/1994 | Tagawa et al. |
| 5,331,357 A | 7/1994 | Cooley et al. |
| 5,367,345 A | 11/1994 | da Silva |
| 5,438,698 A | 8/1995 | Burton et al. |
| 5,452,190 A | 9/1995 | Priesemuth |
| 5,460,346 A | 10/1995 | Hirsch |
| 5,485,358 A | 1/1996 | Chien |
| 5,541,767 A | 7/1996 | Murphy et al. |
| 5,541,816 A | 7/1996 | Miserendino |
| 5,546,099 A | 8/1996 | Quint et al. |
| D375,372 S | 11/1996 | Allen |
| 5,575,554 A | 11/1996 | Guritz |
| 5,606,743 A | 2/1997 | Vogt et al. |
| 5,608,808 A | 3/1997 | da Silva |
| 5,610,678 A | 3/1997 | Tsuboi et al. |
| D383,754 S | 9/1997 | Yuen |
| D383,863 S | 9/1997 | Yuen |
| 5,667,291 A | 9/1997 | Caplan et al. |
| 5,667,292 A | 9/1997 | Sabalvaro |
| D388,113 S | 12/1997 | Feinbloom |
| 5,708,449 A | 1/1998 | Heacock |
| 5,722,762 A | 3/1998 | Soll |
| 5,741,060 A | 4/1998 | Johnson |
| 5,786,665 A | 7/1998 | Ohtsuki et al. |
| 5,806,961 A | 9/1998 | Dalton et al. |
| 5,836,673 A | 11/1998 | Lopez |
| D405,901 S | 2/1999 | Feinbloom et al. |
| 5,871,271 A | 2/1999 | Chien |
| 5,893,631 A | 4/1999 | Padden |
| 5,918,966 A | 7/1999 | Arnold |
| 5,946,071 A | 8/1999 | Feldman |
| 5,997,165 A | 12/1999 | Lehrer |
| 6,005,536 A | 12/1999 | Beadles et al. |
| 6,012,822 A | 1/2000 | Robinson |
| 6,012,827 A | 1/2000 | Caplan et al. |
| D420,035 S | 2/2000 | Hartman |
| 6,056,413 A | 5/2000 | Urso |
| D428,431 S | 7/2000 | Jordan |
| 6,086,214 A | 7/2000 | Ridge |
| 6,172,657 B1 | 1/2001 | Kamakura et al. |
| 6,174,075 B1 | 1/2001 | Fuwausa |
| 6,206,543 B1 | 3/2001 | Henry |
| D445,928 S | 7/2001 | Sharrah et al. |
| D446,324 S | 8/2001 | Lynch et al. |
| 6,290,368 B1 | 9/2001 | Lehrer |
| 6,299,323 B1 | 10/2001 | Yu et al. |
| 6,302,570 B1 | 10/2001 | Petell et al. |
| 6,311,837 B1 | 11/2001 | Blaustein et al. |
| 6,320,822 B1 | 11/2001 | Okeya et al. |
| 6,367,949 B1 | 4/2002 | Pederson |
| D457,670 S | 5/2002 | Allen |
| 6,386,701 B1 | 5/2002 | Khulusi |
| 6,390,640 B1 | 5/2002 | Wong |
| 6,431,904 B1 | 8/2002 | Berelsman |
| 6,439,738 B1 | 8/2002 | Matthews et al. |
| 6,457,838 B1 | 10/2002 | Dugmore et al. |
| 6,461,025 B1 | 10/2002 | Payne |
| 6,474,830 B1 | 11/2002 | Hansen |
| D469,198 S | 1/2003 | Olson |
| 6,504,099 B2 | 1/2003 | Huang |
| 6,523,973 B2 | 2/2003 | Galli |
| 6,530,672 B2 | 3/2003 | Galli |
| D473,890 S | 4/2003 | Waters |
| 6,549,231 B1 | 4/2003 | Matsui |
| 6,554,444 B2 | 4/2003 | Shimada et al. |
| D477,432 S | 7/2003 | Parsons |
| 6,604,837 B2 | 8/2003 | Sandberg |
| 6,612,695 B2 | 9/2003 | Waters |
| 6,612,696 B2 | 9/2003 | Waters |
| D484,905 S | 1/2004 | Waters |
| 6,713,956 B2 | 3/2004 | Chen |
| 6,733,150 B1 | 5/2004 | Hanley |
| 6,749,166 B2 | 6/2004 | Valentine et al. |
| 6,764,194 B1 | 7/2004 | Cooper |
| 6,802,636 B1 | 10/2004 | Bailey, Jr. |
| 6,808,284 B1 | 10/2004 | Chao |
| 6,811,441 B2 | 11/2004 | Simpson |
| 6,824,265 B1 * | 11/2004 | Harper ...................... 351/158 |
| 6,830,357 B2 | 12/2004 | Lopez |
| D501,266 S | 1/2005 | Harris et al. |
| 6,857,739 B1 | 2/2005 | Watson |
| 6,860,628 B2 | 3/2005 | Robertson |
| 6,863,416 B2 | 3/2005 | Waters |
| D507,368 S | 7/2005 | Waters |
| D507,369 S | 7/2005 | Waters |
| 6,929,878 B2 | 8/2005 | Chen et al. |
| 6,966,668 B2 | 11/2005 | Cugini et al. |
| 6,977,776 B2 | 12/2005 | Volkenandt et al. |
| 6,993,803 B2 | 2/2006 | Chan |
| 6,997,552 B1 * | 2/2006 | Hung ........................ 351/51 |
| 7,003,353 B1 | 2/2006 | Parkhouse |
| 7,004,582 B2 | 2/2006 | Jannard et al. |
| 7,008,074 B1 | 3/2006 | Halm |
| 7,021,790 B2 | 4/2006 | Parsons |
| 7,094,981 B2 | 8/2006 | Sorrentino et al. |
| 7,104,670 B2 | 9/2006 | Waters |
| 7,105,939 B2 | 9/2006 | Bednyak |
| 7,111,956 B2 | 9/2006 | Brown |
| 7,118,241 B2 | 10/2006 | Sohn |
| 7,118,262 B2 | 10/2006 | Negley |
| 7,147,324 B2 | 12/2006 | Jannard et al. |
| 7,150,526 B2 | 12/2006 | Jannard et al. |
| 7,213,917 B2 | 5/2007 | Jannard et al. |

| | | |
|---|---|---|
| 7,216,973 B2 | 5/2007 | Jannard et al. |
| 7,226,180 B2 | 6/2007 | Sung |
| 7,234,831 B1 | 6/2007 | Hanley |
| 7,255,437 B2 | 8/2007 | Howell et al. |
| 7,264,350 B2 | 9/2007 | Jannard et al. |
| D553,177 S | 10/2007 | Chen |
| 7,278,734 B2 | 10/2007 | Jannard et al. |
| 7,281,826 B2 | 10/2007 | Huang |
| D568,922 S | 5/2008 | Anderl |
| 7,377,664 B2 | 5/2008 | Waters |
| 7,422,324 B2 | 9/2008 | Lee |
| 7,438,409 B2 * | 10/2008 | Jordan ............... 351/158 |
| 7,562,979 B2 | 7/2009 | Waters |
| D600,738 S | 9/2009 | Su et al. |
| 7,607,775 B2 * | 10/2009 | Hermanson et al. ......... 351/158 |
| 7,661,818 B2 | 2/2010 | Waters |
| D611,086 S | 3/2010 | Meng-Suen |
| 7,699,486 B1 | 4/2010 | Beiner |
| D617,826 S | 6/2010 | Waters |
| 7,862,979 B2 | 1/2011 | Morris et al. |
| 7,938,553 B1 | 5/2011 | Beiner |
| 7,942,522 B2 | 5/2011 | Sonsino |
| 7,946,705 B1 | 5/2011 | Hsu |
| 7,997,724 B1 * | 8/2011 | Hsu ............... 351/158 |
| 8,007,101 B1 | 8/2011 | Wang |
| 8,109,630 B2 * | 2/2012 | Sonsino ............... 351/158 |
| 8,152,330 B2 | 4/2012 | Waters |
| 8,235,524 B2 | 8/2012 | Waters |
| 2002/0131275 A1 | 9/2002 | Yamamoto et al. |
| 2002/0163800 A1 | 11/2002 | Hansen |
| 2002/0186557 A1 | 12/2002 | Lary et al. |
| 2002/0187806 A1 | 12/2002 | Jang |
| 2003/0079387 A1 | 5/2003 | Derose |
| 2003/0086053 A1 | 5/2003 | Waters |
| 2003/0086054 A1 | 5/2003 | Waters |
| 2003/0169207 A1 | 9/2003 | Beigel |
| 2003/0189824 A1 | 10/2003 | Meeder et al. |
| 2003/0206269 A1 | 11/2003 | Waters |
| 2004/0222638 A1 | 11/2004 | Bednyak |
| 2004/0240067 A1 | 12/2004 | Marusi et al. |
| 2004/0240204 A1 | 12/2004 | Russ et al. |
| 2004/0264176 A1 | 12/2004 | Vanderschuit |
| 2005/0001433 A1 | 1/2005 | Seelin |
| 2005/0072458 A1 | 4/2005 | Goldstein |
| 2005/0099799 A1 | 5/2005 | Cugini et al. |
| 2005/0204490 A1 | 9/2005 | Kemp et al. |
| 2005/0211187 A1 | 9/2005 | Harman et al. |
| 2005/0248932 A1 | 11/2005 | Waters |
| 2005/0254238 A1 | 11/2005 | Parker et al. |
| 2005/0265015 A1 | 12/2005 | Salazar |
| 2006/0012974 A1 | 1/2006 | Su |
| 2006/0012975 A1 | 1/2006 | Huttner et al. |
| 2006/0091784 A1 | 5/2006 | Conner et al. |
| 2006/0092621 A1 | 5/2006 | Lai |
| 2006/0138440 A1 | 6/2006 | Jyo |
| 2006/0141828 A1 | 6/2006 | Dean et al. |
| 2006/0158895 A1 | 7/2006 | Brands et al. |
| 2006/0197905 A1 | 9/2006 | Lu |
| 2006/0198122 A1 | 9/2006 | Senter et al. |
| 2006/0232239 A1 | 10/2006 | Maglica et al. |
| 2006/0238995 A1 | 10/2006 | Wang |
| 2006/0239018 A1 | 10/2006 | Jardin |
| 2006/0291193 A1 | 12/2006 | Hill |
| 2007/0013865 A1 | 1/2007 | Jordan |
| 2007/0030442 A1 | 2/2007 | Howell et al. |
| 2007/0053179 A1 | 3/2007 | Pang et al. |
| 2007/0058361 A1 | 3/2007 | Sevilla |
| 2007/0074752 A1 | 4/2007 | Shau et al. |
| 2007/0127250 A1 | 6/2007 | Waters |
| 2007/0145746 A1 | 6/2007 | Biamonte |
| 2007/0153500 A1 | 7/2007 | Waters |
| 2007/0153537 A1 | 7/2007 | Scott et al. |
| 2007/0159810 A1 | 7/2007 | Kim |
| 2007/0159823 A1 | 7/2007 | Ho et al. |
| 2007/0189003 A1 | 8/2007 | Daley |
| 2007/0206373 A1 | 9/2007 | Whiteside et al. |
| 2007/0236649 A1 | 10/2007 | Lin |
| 2007/0236915 A1 | 10/2007 | Chen |
| 2007/0236916 A1 | 10/2007 | Hsu |
| 2008/0069391 A1 | 3/2008 | Steyn et al. |
| 2008/0130272 A1 | 6/2008 | Waters |
| 2009/0190026 A1 | 7/2009 | Chen |
| 2009/0213323 A1 | 8/2009 | Hermanson et al. |
| 2010/0134761 A1 | 6/2010 | Johns et al. |
| 2010/0182563 A1 | 7/2010 | Waters |
| 2011/0013135 A1 | 1/2011 | Waters |
| 2011/0075095 A1 | 3/2011 | Waters |
| 2011/0211156 A1 | 9/2011 | Beiner |
| 2011/0228211 A1 | 9/2011 | Waters |
| 2012/0062830 A1 | 3/2012 | Waters |
| 2012/0155064 A1 | 6/2012 | Waters |

FOREIGN PATENT DOCUMENTS

| | | |
|---|---|---|
| CA | 2610073 A1 | 5/2008 |
| CN | 1603677 A | 4/2005 |
| CN | 2826472 Y | 10/2006 |
| CN | 201548769 U | 8/2010 |
| CN | 101950091 A | 1/2011 |
| CN | 201707513 U | 1/2011 |
| CN | 301445845 S | 1/2011 |
| CN | 201796205 U | 4/2011 |
| DE | 3043007 | 6/1982 |
| DE | 9410886 | 9/1994 |
| EP | 1451633 | 9/2004 |
| EP | 2 290 433 A1 | 3/2011 |
| EP | 2 299 311 A1 | 3/2011 |
| EP | 2 350 734 | 8/2011 |
| GB | 2272073 A | 5/1994 |
| JP | 2004-207580 A | 7/2004 |
| WO | 01/13033 A1 | 2/2001 |
| WO | 01/77575 A1 | 10/2001 |
| WO | 03/040808 | 5/2003 |
| WO | 2006/124928 A1 | 11/2006 |
| WO | 2007/058706 A2 | 5/2007 |
| WO | 2011/041591 A1 | 4/2011 |
| WO | 2011/100471 A1 | 8/2011 |
| ZA | 2004/3826 A | 9/2005 |

OTHER PUBLICATIONS

Office Action issued in related Canadian Application No. 2,466,175 dated Sep. 22, 2010 (3 pages).

Supplementary European search report issued in the related European Application No. 02 77 8755 dated Jan. 19, 2005 (2 pages).

Office Action issued in related European Application No. 02 778 755.5 dated Feb. 20, 2007 (7 pages).

Extended European search report issued in the related European Application No. 10 18 1592.6 dated Jan. 31, 2011 (7 pages).

Extended European search report issued in the related European Application No. 10 18 1593.4 dated Feb. 1, 2011 (8 pages).

International Search Report from the International Bureau of WIPO issued in the related International Application No. PCT/US02/35665, dated Jun. 27, 2003, 1 page.

Written Opinion of the International Searching Authority and International Search Report from the International Bureau of WIPO for International Application No. PCT/US2006/018968, dated Oct. 16, 2006, 7 pages.

Notification of Transmittal of the International Search Report and the Written Opinion of the International Searching Authority, or the Declaration from the International Bureau of WIPO for International Application No. PCT/US10/50978, dated Dec. 3, 2010, 16 pages.

Notification of Transmittal of the International Search Report and the Written Opinion of the International Searching Authority, or the Declaration from the International Bureau of WIPO for International Application No. PCT/US2011/024400, dated Apr. 29, 2011, 13 pages.

Docket report of *Waters Industries, Inc. v. Mr. Christmas Incorporated, et al.*, United States District Court for the Northern District of Illinois, Case No. 1:09-cv-07577, filed Dec. 7, 2009, 5 pages.

"Complaint", *Waters Industries, Inc. v. Mr. Christmas Incorporated, et al.*, United States District Court for the Northern District of Illinois, Case No. 1:09-cv-07577, 38 pages (Docket No. 1, Dec. 7, 2009).

Docket report of *Waters Industries, Inc. v. The Gerson Company*, United States District Court for the Northern District of Illinois, Case No. 1:10-cv-01865, filed Mar. 24, 2010, 3 pages.

"Complaint", *Waters Industries, Inc.* v. *The Gerson Company*, United States District Court for the Northern District of Illinois, Case No. 1:10-cv-01865,71 pages (Docket No. 1, Mar. 24, 2010).
Docket report of *Waters Industries, Inc.* v. *Sweet Baby, Inc. dba AJ Morgan et al.*, United States District Court for the Northern District of Illinois, Case No. 1:09-cv-07595, filed Dec. 7, 2009, 7 pages.
"Complaint", *Waters Industries, Inc.* v. *Sweet Baby, Inc. dba AJ Morgan et al.*, United States District Court for the Northern District of Illinois, Case No. 1:09-cv-07595, 78 pages (Docket No. 1, Dec. 7, 2009).
"Answer to Complaint, Counterclaims", filed by Sweet Baby, Inc. dba AJ Morgan, *Waters Industries, Inc.* v. *Sweet Baby, Inc. dba AJ Morgan et al.*, United States District Court for the Northern District of Illinois, Case No. 1:09-cv-07595, 15 pages (Docket No. 27, Feb. 4, 2010).
"Answer to Complaint, Counterclaims", filed by Lilian Vernon Corporation, *Waters Industries, Inc.* v. *Sweet Baby, Inc. dba AJ Morgan et al.*, United States District Court for the Northern District of Illinois, Case No. 1:09-cv-07595, 15 pages (Docket No. 28, Feb. 4, 2010).
Docket report of *Waters Industries, Inc.* v. *Kikkerland Design, Inc.*, United States District Court for the Northern District of Illinois, Case No. 1:10-cv-04076, filed Jun. 30, 2010, 4 pages.
"Complaint", *Waters Industries, Inc.* v. *Kikkerland Design, Inc.*, United States District Court for the Northern District of Illinois, Case No. 1:10-cv-04076, 21 pages (Docket No. 1, Jun. 30, 2010).
"Kikkerland Design, Inc.'s Answer to Complaint, Affirmative Defenses and Counterclaim", *Waters Industries, Inc.* v. *Kikkerland Design, Inc.*, United States District Court for the Northern District of Illinois, Case No. 1:10-cv-04076, 12 pages (Docket No. 17, Aug. 6, 2010).
"Complaint" with Exhibit A through D, *Waters Industries, Inc.* v. *JJI International, Inc., et al.*, United States District Court for the Northern District of Illinois, Case No. 1:11-cv-03791, 73 pages. (Document No. 1, Jun. 3, 2011).
"Defendants' Answer and Counterclaim" and "Responses to Specific Allegations", *Waters Industries, Inc.* v. *JJI International, Inc.* and *Stein Mart, Inc.*, United States District Court for the Northern District of Illinois, Case No. 1:11-cv-03791, 16 pages (Document No. 15, Jun. 28, 2011).
"Plaintiff's Initial Infringement Contentions Under Local Patent Rule 2.2" with Appendix A through F, *Waters Industries, Inc.* v. *JJI International, Inc.* and *Stein Mart, Inc.*, United States District Court for the Northern District of Illinois, Case No. 1:11-cv-03791, 44 pp. (Jul. 26, 2011).
"Defendants' Initial Non-Infringement and Invalidity Contentions" with Appendix A though G, *Waters Industries, Inc.* v. *JJI International, Inc.* and *Stein Mart, Inc.*, United States District Court for the Northern District of Illinois, Case No. 1:11-cv-03791, 78 pages (Aug. 9, 2011).
"Plaintiff's Initial Response to Invalidity Contentions Under Local Patent Rule 2.5" with Appendix A and B, *Waters Industries, Inc.* v. *JJI International, Inc.* and *Stein Mart, Inc.*, United States District Court for the Northern District of Illinois, Case No. 1:11-cv-03791, 29 pages (Aug. 23, 2011).
"Complaint", *Waters Industries, Inc.* v. *JJI International, Inc.*, United States District Court of the Northern District of Illinois, Case No. 1:12-cv-06195, 4 pages (Aug. 7, 2012).
"Defendant's Answer, Affirmative Defenses and Counterclaim", *Waters Industries, Inc.* v. *JJI International, Inc.*, United States District Court of the Northern District of Illinois, Case No. 1:12-cv-06195, 9 pages (Sep. 4, 2012).
"Plaintiff's Answer to Defendant's Counterclaims", *Waters Industries, Inc.* v. *JJI International, Inc.*, United States District Court of the Northern District of Illinois, Case No. 1:12-cv-06195, 4 pages (Sep. 28, 2012).
"Plaintiff's Initial Infringement Contentions Under Local Patent Rule 2.2" with Appendix A through B, *Waters Industries, Inc.* v. *JJI International, Inc.*, United States District Court of the Northern District of Illinois, Case No. 1:12-cv-06195, 30 pages (Oct. 2, 2012).
"Defendant's Initial Non-Infringement and Invailidity Contentions" with Appendix A through B and Figure D1, *Waters Industries, Inc.* v. *JJI International, Inc.*, United States District Court of the Northern District of Illinois, Case No. 1:12-cv-06195, 31 pages (Oct. 16, 2012).
"Defendants' Final Invalidity Contentions" with Appendix A though D, *Waters Industries, Inc.* v. *JJI International, Inc.* and *Stein Mart, Inc.*, United States District Court for the Northern District of Illinois, Case No. 1:11-cv-03791, 33 pages (Feb. 21, 2012).
"Plaintiff's Final Infringement Contentions Under Local Patent Rule 3.1" with Appendix A though F, *Waters Industries, Inc.* v. *JJI International, Inc.* and *Stein Mart, Inc.*, United States District Court for the Northern District of Illinois, Case No. 1:11-cv-03791, 58 pages (Feb. 21, 2012).
"Plaintiff's Response to Defendants' Final Invalidity Contentions Under Local Patent Rule 3.2" with Appendix A though D-4, *Waters Industries, Inc.* v. *JJI International, Inc.* and *Stein Mart, Inc.*, United States District Court for the Northern District of Illinois, Case No. 1:11-cv-03791, 73 pages (Mar. 19, 2012).

* cited by examiner

ILLUMINATED EYEWEAR

CROSS-REFERENCE TO RELATED APPLICATIONS

This application is a continuation-in-part of U.S. application Ser. No. 11/941,558, filed Nov. 16, 2007, which is a continuation-in-part of prior International Application Number PCT/US2006/018968, filed May 17, 2006, which claims benefit of U.S. Provisional Application No. 60/681,852, filed May 17, 2005 and U.S. Provisional Application No. 60/746,217, filed May 2, 2006, which are all hereby incorporated herein by reference in their entirety. This application is also a continuation-in-part of U.S. application Ser. No. 12/895,456, filed Sep. 30, 2010, which claims the benefit of U.S. Provisional Application No. 61/247,243, filed Sep. 30, 2009, which are both hereby incorporated herein by reference in their entirety. This application also claims the benefit of U.S. Provisional Application No. 61/303,212, filed Feb. 10, 2010, which is hereby incorporated by reference herein in its entirety.

FIELD

The invention relates to hands-free lighting devices and, more particularly, to illuminated eyewear.

BACKGROUND

Often an individual desires a light source to illuminate an area while performing a task or a light source directed in a general outward direction for visibility. Holding a flashlight is an option, but such lighting devices are often cumbersome and may detract from the task being completed because the flashlight must be held. As a result, hands-free lighting is often used because the individual desiring illumination does not need to hold the light source. Common types of hand-free lighting include light sources mounted to headgear or eyeglasses.

Light sources on eyeglasses usually include mounting arrangements of the light source, which may be an LED, on either the cross-frame or temple of the eyeglass so as to provide illumination forwardly of the wearer. In such configuration, lighted eyeglasses can be used to provide directed or focused light so that an area immediately forward of the wearer, e.g., 6-24 inches from their eyes, can be illuminated for tasks such as reading typical sized print. For other activities, such as walking at night, camping or everyday use, lighting areas even further ahead of the individual may be desirable. However, prior lighted glasses configured to provide hands-free lighting for some of these various purposes have often been heavy, bulky, inconvenient, and/or have an unsightly appearance where the lighting is conspicuous on the lighted glasses.

In this regard, some prior lighted glasses have separate and bulky lighting modules fastened to the glasses such as disclosed in U.S. Pat. No. 5,541,767 to Murphy et al.; U.S. Pat. No. 4,959,760 to Wu; and U.S. Pat. No. 3,769,663 to Perl. These glasses are heavy and/or bulky making them inconvenient for a user to wear. In addition, these prior lighted glasses conspicuously mount the lighting modules to the glasses or incorporate electronic components for the lighting therein so that the presence of the light modules or electronic components is visually prominent when the glasses are worn, giving the glasses an unsightly appearance.

SUMMARY

Illuminated eyewear is provided that directs light forwardly from the user when wearing the eyewear.

The illuminated eyewear herein is in the form of eyeglasses, either with or without lenses, or with a lens or lenses that can be refractive or non-refractive, that in one aspect has light sources arranged so as to optimize their performance. In another aspect, the illustrated eyewear herein has electrical components for the light sources arranged to provide enhanced aesthetics over prior lighted eyeglasses. The frame of the eyewear herein can have a single-piece construction or can have temple arm members that are pivotable with respect to a cross-frame member.

In one form, the eyewear includes a cross-frame member or portion with, at least in part, a bridge portion that extends generally laterally along a front lateral axis. The eyewear further includes a pair of temple arm members or portions, which can be integral with the cross-frame portion or pivotable about a pivot connection between each of the temple arm portions and the cross-frame portion. The cross frame portion includes outer front portions adjacent to the temple arm portions in the use configuration. A use configuration of the temple arm portions corresponds to the temple arm portions extending rearwardly from the cross-frame portion, which by one approach extends along respective fore-and-aft axes that are generally orthogonal to the cross-frame lateral axis. In the pivotable configuration, the temple arm portions further include a storage configuration with the temple arm portions pivoted about the pivot connections to generally extend laterally adjacent to the cross-frame portion generally along the lateral axis. Adjacent to each of the outer front portions is a light source, which in the preferred form is an LED. The cross-frame portion also includes pass-through portions of the outer front portions thereof oriented forwardly of the respective light sources. Being oriented forwardly of the light source places the pass-through portion at least partially within a light projection area for the light source. The pass-through portion is configured to allow light projected from the light source to project through the cross-frame portion to an area forwardly of the cross-frame portion. The pass-through portion can be a transparent, translucent, refractive, tinted, wavelength/color filter, diffusing, or the like, portion of the cross-frame portion or member, can be an opening or cavity in the cross-frame member/portion, or throughbore through the cross-frame portion. In the throughbore example, the pass-through portion can include a cap of material fitted therein which can be transparent, translucent, refractive, tinted, a wavelength/color filter, diffusing, or the like. Preferably, a forward surface of the cap is substantially flush with a forward surface of the cross-frame portion.

Illuminated eyewear including the above-discussed pass-through portion in the cross-frame portion is configured such that, with the temple arm portions or members in the use configuration, the cross-frame portion substantially hides the light sources from view along the sides of the illuminated eyewear, which preserves an aesthetic of traditional eyeglasses. The pass-through portion, however, also allows the illuminated eyewear to project light forwardly of the eyeglasses.

Another form of illuminated eyewear includes a pair of temple arm portions, each having rear end portions configured to rest on a user's ears and opposite forward end portions. The illuminated eyewear further includes a front support portion that includes opposite end portions and an intermediate bridge portion configured to rest on a user's nose. Pivot connections are positioned between the forward end portions of the temple arm portions and the opposite end portions of the front support portion. So configured, the temple arm portions and the front support portion have a use configuration where the front support portion generally extends along a lateral axis and the temple arm portions extend along longitudinal axes that are generally orthogonal to the lateral axis. A light source is mounted adjacent to each of the pivot connections. A battery compartment is provided in each of the forward end portions of the temple arm portions. The battery compartment is sized to house a pair of batteries, such as coin cell batteries, in a side-by-side orientation or a rechargeable battery therein. The battery compartment further includes an opening provided on a bottom surface of each temple arm portion. A movable door is mounted to each temple arm portion and can be shifted between a first position where the battery compartment is closed and a second position where the battery compartment is open.

In yet another form, the illuminated eyewear includes a pair of temple arm members, each having forward and rearward ends, and a front support including, at least in part, a bridge portion that extends laterally between the forward ends of the temple arm members. A hinge is positioned between each of the forward ends of the temple arm members and the laterally extending front support that allows each temple arm member to be shifted between an open configuration, where the temple arm members are pivoted away from the laterally extending front support to extend rearwardly therefrom, and a closed configuration, where the temple arm members are pivoted toward the laterally extending front support to extend therealong adjacent thereto. Each temple arm member includes a light source mounted thereto for projecting light therefrom, a power source for providing power to the light source, and a switch for turning the light source on and off. Each temple arm member also includes an adjustment mechanism that is configured to varying the light intensity emitted by each light source, such as in response to manipulation by a user. This form provides light intensity variations that can be utilized to provide a softer intensity or brighter intensity when desired.

In still a different form, the illuminated eyewear includes a pair of temple arm members, each having forward and rearward ends, and a front support including, at least in part, a bridge portion that extends laterally between the forward ends of the temple arm members. A hinge is positioned between each of the forward ends of the temple arm members and the laterally extending front support that allows each temple arm member to be shifted between an open configuration, where the temple arm members are pivoted away from the laterally extending front support to extend rearwardly therefrom, and a closed configuration, where the temple arm members are pivoted toward the laterally extending front support to extend therealong adjacent thereto. Each temple arm member includes a light source mounted thereto for projecting light therefrom, a power source for providing power to the light source, and a switch for turning the light source on and off. Each light source also includes light modifying material disposed thereon, where the material is selected so as to change the normal or typical appearance of the light beam projected through a typical transparent lens of the light source, such as including a translucent or diffusing coating on the light source lens to soften an appearance of light emitted from the light source, including a refractive coating to focus or diverge the light emitted from the light source, including a tinted coating so that light emitted from the light source has a desired color, and/or including a color and/or wavelength filter coating on the light source lens.

In one form, the eyewear includes a pair of temple arm members where each temple arm member has a forward and rearward end. Each temple arm member also has inner and outer surface portions that have a flat configuration and extend lengthwise between the forward and rearward ends of the respective temple arm members. In this form, the eyewear further includes a front support including, at least in part, a bridge portion that extends between the forward ends of the temple arms members. So configured, the temple arm members and the bridge portion are adapted to be supported on a user's ears and nose. Pivot connections couple the temple arm members with the front support allowing the temple arm members to pivot relative thereto. The eyewear also includes at least one light source mounted to the front support, which is powered by a plurality of thin, compact generally flat disc-shaped batteries, such as conventional disc-shaped coin-cell batteries. Preferably, the at least one light source is received within a cut-out or opening formed in the front support, and more preferably the light source is entirely received within the cut-out in the front support so that the light source is hidden when viewed from the side. A pass-through portion of the front support is provided, such as in the form of a laminate layer or light transmissive coating, which can be painted or dipped, extending over the opening, in covering relation thereto to enclose the light source therein. The pass-through layer or coating allows at least some of the light emitted from the light source to shine forwardly of a wearer of the illuminated eyewear, while also providing protection for the light source and preserving a traditional aesthetic for the illuminated eyewear so that, for example, a front surface of the front support can have a substantially continuous, unbroken configuration and appearance.

By embedding the light source or light sources in the front support, the illuminated eyewear in this form has an appearance more similar to conventional non-illuminated eyewear, such as with the light sources hidden from view. For example, prior lighted eyeglasses commonly have light modules mounted to an outer surface of eyeglass temple arms or on an outer surface of the front frame. Configured this way, prior light modules extend outwardly from the outer surfaces, making the eyewear significantly wider and prominently displaying the module so it can be readily seen when the lighted eyeglasses are worn. This conspicuous display of lighting components in prior lighted eyeglasses detract from the aesthetics and appearance of the eyewear. The illuminated eyewear disclosed in certain forms herein, on the other hand, has all of the lighting components either mounted on an inside surface of the temple arm members or embedded within the front support. This configuration is such that it is not immediately apparent that the illumination components are present on the glasses, instead having an aesthetic substantially similar to conventional eyeglasses when being worn.

In certain forms of the illuminated eyewear, the at least one light source can include an inward and/or downward cant so that the at least one light source advantageously projects light forwardly of the wearer in a field of view that generally corresponds to where an object to be viewed will be held by the wearer. Thus, the wearer does not need to tilt or shift their head to align the light sources or orient the illumination to focus the light beams within this field of view. With lighted glasses having two or more light sources, the light sources can have different vertical and/or horizontal cant angles to illuminate two or more different areas forwardly of the lighted glasses.

Also, it should be recognized that in certain eyeglass frames the temple and cross-frame portions can be formed as a single, unitary component lacking pivot or hinge connections therebetween. In this instance, the above discussed cross-frame and temple arm members and their associated features including the lighting components will correspond to a cross-frame portion and temple arm portions that extend rearward from the cross-frame portion in a unitary frame.

DETAILED DESCRIPTION OF THE PREFERRED EMBODIMENT

Figure 1:
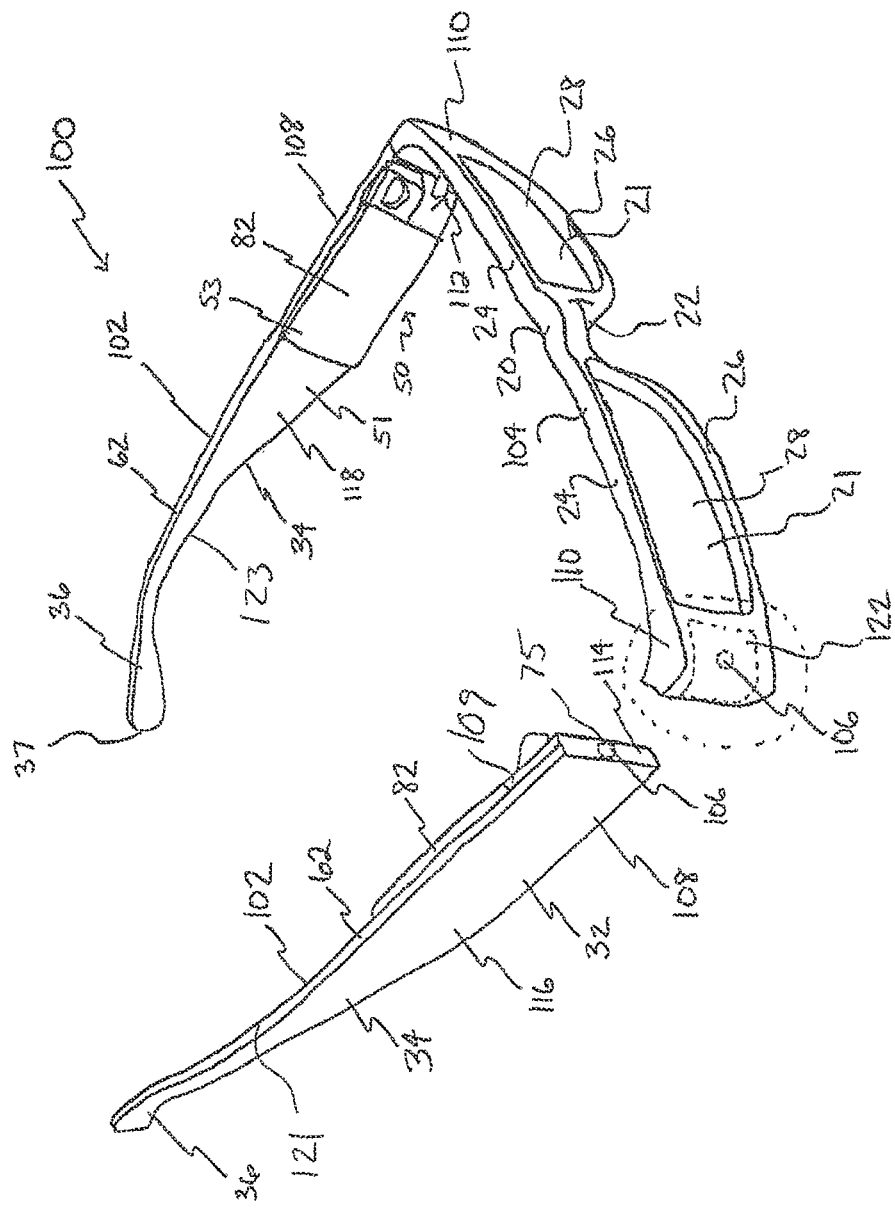
FIG. 1 is a perspective view of illuminated eyewear showing temple arm members in a pivoted open configuration relative to a cross-frame member with a LED light source on either the temple arm member or front frame disposed adjacent respective end portions of the cross-frame member.

In general and as further described below, illuminated eyewear, which may or may not include a lens or lenses attached thereto, is provided to project light forwardly of the wearer. As generally shown in FIG. 1, the illuminated eyewear 100 can be configured to have a typical eyeglass frame or frame assembly including a plurality of generally rigid frame members including a pair of spaced temple arm portions or members 102 with a front support in the form of a cross-frame portion or member 104 extending laterally between the temple arm members 102. As illustrated, the temple arm members 102 are pivotally connected to the cross-member 104 via hinges 112 at the juncture between laterally opposite end or outer portions 110 of the cross-frame member 104 and front end portions 108 of the temple arm members 102. The temple arm members 102 can alternatively be integral with the cross-frame member 104 or otherwise securely attached thereto.

Other constructions for the cross-frame member 104 of the lighted eyewear are also contemplated including those where the cross-frame member 104 is modified to include several components or parts, or alternatives where these components are substantially eliminated so that the cross-frame only includes an intermediate bridge portion or member 20 connected to lenses 21 at either end thereof. The lenses 21 can also have outer front frame portions connected only to the laterally outward portions thereof so that the cross-frame member includes multiple parts. Alternatively, only a single lens 21 may be provided extending between and pivotally connected to the forward end portions 108 of the temple arm members 102 with the bridge portion 20 integrated into the lens 21. The lenses 21 themselves may be either refractive to provide vision correction or non-refractive to only provide a transparent shield for protection, as with safety glasses. Manifestly, the lens or lenses 21 need not be provided as the eyeglass frame could be used only to provide for hands-free lighting. Herein, the front support contemplates all these and other constructions for the single or multiple part cross-frame members with or without lenses.

The illuminated eyewear 100 further includes one or more light sources 106 mounted thereto to provide lighting forwardly of a wearer. The light sources 106 can be mounted to either the temple arms 102 and/or the front cross frame 104. The light sources 106 are preferably light emitting diodes (LEDs), but other suitable electroluminescent lamps, suitable incandescent lamps, gas discharge lamps, high-intensity discharge lamps, or any other suitable light source, such as a laser diode, can be utilized. In the illustrated form, the LED includes a lens 75 having a cylindrical base portion 77 and a dome shaped cap portion 79. A diode or illumination chip 81 within the lens 75 energizes with a supply of electrical energy and projects light forwardly of the LED.

In yet another aspect, the light sources 106 of the illuminated eyewear can be canted inwardly and/or downwardly at angles that allow the light cones of the light sources to intersect at or shine in a viewing or reading area forwardly of the wearer. By directing light automatically to this viewing area when the lighted eyeglasses 100 are worn without requiring adjustments of the lights, a wearer of the illuminated eyewear 100 has little need to turn, tilt, or otherwise maneuver the positioning of his/her head to orient the light into a viewing area. The viewing area corresponds to an area in front of the wearer, such as a working area to illuminate an object held or being worked on by the wearer, such as a tool, book, work table, etc.

Referring to FIGS. 1-7, one form of exemplary illuminated eyewear 100 is illustrated in more detail. As mentioned above, the front-support or cross-frame member 104 includes the bridge portion 20 intermediate of the end portions 110. The bridge portion 20 is configured to allow the cross-frame member 104 to rest on and be supported by the bridge of a wearer's nose. The bridge portion 20 includes downwardly and rearwardly extending side rests 22 configured to engage the sides of the wearer's nose. As illustrated, the bridge portion 20 is a one-piece structure having a truncated generally triangular shape, however, the bridge portion 20 could alternatively include other configurations, such as employing adjustable pads attached to the cross-frame member 104 configured to contact and rest upon the sides of the wearer's nose instead of the side rests 22 and frame configuration.

In the illustrated form, the cross-frame member 104 of the illuminated eyewear 100 includes an upper frame member 24 and a lower frame member 26 extending from both sides of the bridge portion 20 to the end portions 110 thereof. However, the front support 104 may also include a partial-frame construction with only either the upper frame 24 or the lower frame 26. In a frameless approach, the front support 104 consists of the bridge portion 20 attached directly to lenses, which then can attach directly to the temple arm members 102 or can have an intermediate part to couple the lenses to the temple arm members 102. Other configurations for the front support could also be employed, as has been previously discussed.

The end portions 110 extend rearwardly and pivotally connect to the temple arm members 102. As illustrated, the upper frame member 24 and the lower frame member 26 form lens areas 28 housing the lenses 21. The lens areas 28 are configured to support a variety of eyeglass lens types. For example, the lens areas 28 may be used to support lenses used for safety glasses, sunglasses, prescription glasses, other protective eyewear, or any suitable combination thereof. Alternatively, the lens areas 28 can be left empty and/or the cross-frame member 104 can be formed without the upper frame member 24 or the lower frame member 26, as discussed above.

By one approach, the temple arm members 102 connect to the end portions 110 of the front support 104 by the hinges 112 to allow the temple arm members 102 to pivot relative thereto. As discussed above, however, the temple arm members 102 can also be integral with the front support 104 or rigidly attached thereto. FIG. 1 shows an open or use configuration where the temple arm members 102 extend rearwardly from the front support 102, and preferably generally perpendicular to the cross-frame member 104 along fore-and-aft axes L1 that are generally orthogonal to a lateral axis L2 along which the cross-frame member 104 generally extends. It will be understood, however, that the temple arm members 102 and the front support 102 can each have a curvature to more closely conform to a wearer's head. Additionally, the temple arm members can be angled with respect to the front support and be resilient. So configured, a wearer of the glasses can pull the temple arm members apart and place the glasses on his/her head and the temple arm members will then resiliently grip the wearer's head for a more secure wearing configuration.

The temple arm members 102 can also be configured to pivot or shift to a collapsed, closed, or storage configuration where each temple arm member 102 extends generally laterally along the L2 axis adjacent to the cross-frame member 104. In another form, the frame of the illuminated eyewear 100 can be formed as a single, unitary component lacking pivot or hinge connections between the temple arm members 102 and the cross-frame member 104. In this form, the temple arm members or portions 102 permanently extend rearwardly from the cross-frame member or portion 104 along the fore-and-aft axes L1. Lighting components discussed herein with reference to the temple arm members 102 and/or the cross-frame member 104 are incorporated into the corresponding structure of this unitary frame.

As previously discussed, the temple arm members 102 are pivotally connected to the cross-member 104 via the hinges 112 at the juncture between the end portions 110 of the cross-frame member 104 and the front end portions 108 of the temple arm members 102. In the illustrated form, each temple arm member 102 includes an enlarged portion 32 adjacent the forward end 108 of the temple arm member 12. The temple arm members 102 transition rearwardly from the enlarged portion 32 to an intermediate portion 34 having a narrow section 35 configured to rest on and be supported by the ears of the wearer. The temple arm members 102 terminate at an inwardly and downwardly directed distal portion 36, positioned rearwardly from the intermediate portion 34 and adjacent a rearward end 37 of the temple arm members 102. So configured, the temple arm members 102 generally follow the contour of the wearer's head from adjacent the eyes to a position behind the ears. As illustrated, the enlarged portion 32, the intermediate portion 34, and the distal portion 36 have a generally flat configuration. Of course, other configurations may also be used.

Figure 2:
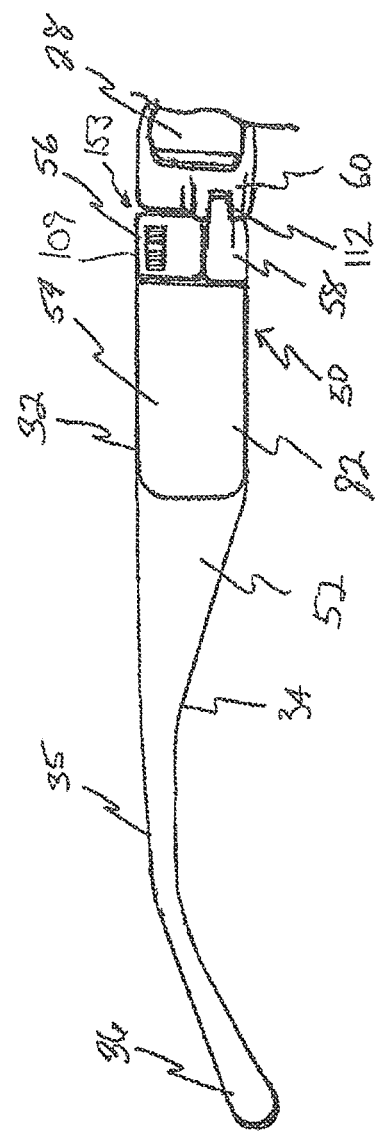
FIG. 2 is an elevated view of one of the temple arm members showing a battery compartment cover and a light switch actuator.
Figure 3:
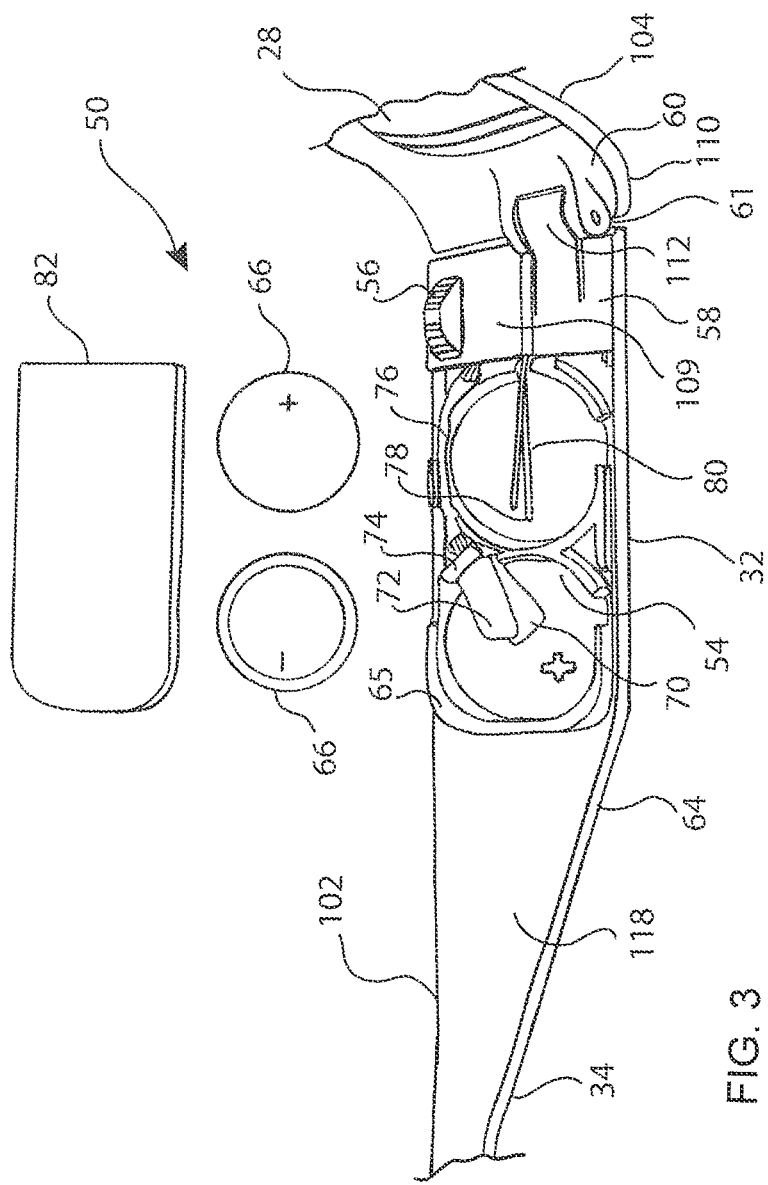
FIG. 3 is an enlarged, exploded view of a portion of the temple arm member of FIG. 2 showing a battery compartment formed along an inner surface of the temple arm member.
Figure 4:
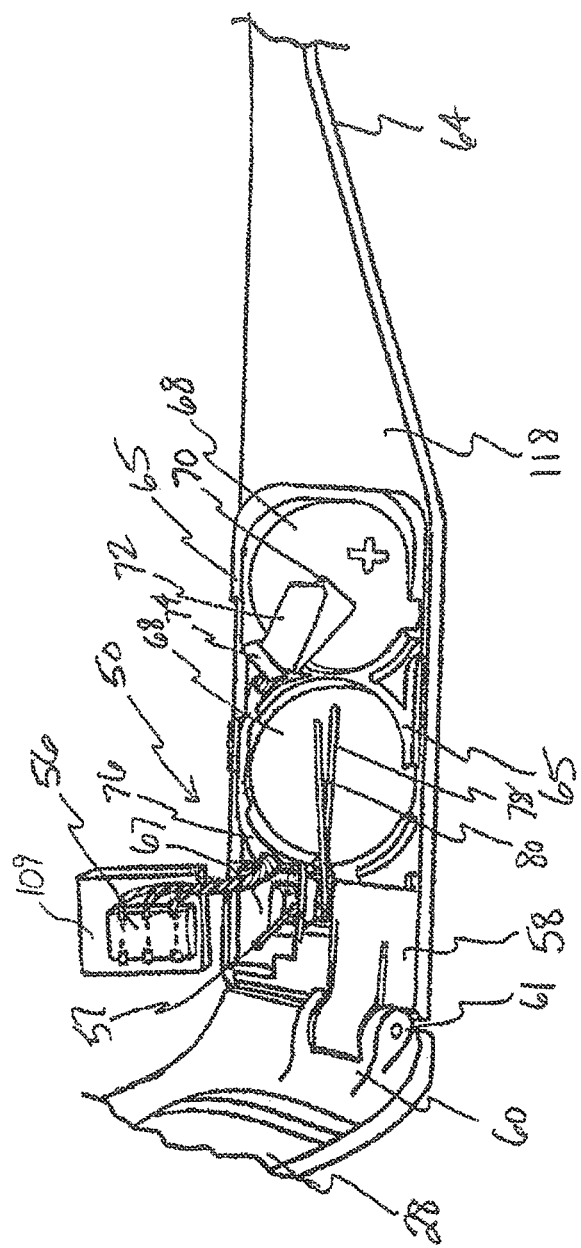
FIG. 4 is an enlarged view of the other temple arm member showing a switch component adjacent the battery compartment.

Referring now to FIGS. 2-4, the light sources 106 require an electronic assembly 50 to provide a power supply. In order to preserve the outwardly visible aesthetics of the illuminated eyewear 100, as described above, the electronic assembly 50 is positioned on and accessible through an inner surface portion 118 of each temple arm member 102. Positioning the electronic assembly 50 on the inner surface portion 118 effectively hides the electronic assembly 50 from view while the illuminated eyewear 100 is worn. The inner surface portion 118 can have a substantially flat configuration and can be positioned so that the inner surface portions 118 of each temple arm member 102 face each other when the temple arm members 102 are shifted to the open configuration. In the illustrated form, the inner surface portion 118 includes both a lower portion 51 and a slightly raised portion 53. The slightly raised portion 53 is preferably adjacent the front frame 104, but can also be positioned in the intermediate portion 34 or the distal portion 36 of the temple arm member 102. More specifically, the electronic assembly 50 can be disposed between the inner surface portion 118 and an outer surface portion 116 of the enlarged portion 32 of the temple member 102. So configured, no components of the electronic assembly 50 are visible on the outer surface portion 116 of the temple arm members 102.

In one approach, the inner surface 118 of the temple arm member 102, and preferably both temple arm members 102, includes a power source compartment 54 recessed therein, which can house the electronic assembly 50. The electronic assembly 50 can include a switch 56, a power source 66, and various electrical connections thereof. As illustrated, the switch 56 is a slide switch, however, other types of switches can be utilized, such as a toggle, a pushbutton, or a touch switch. As shown in FIG. 4, the switch 56 is electrically connected to one of the light source contacts 57 and also to the power source 66.

Preferably, the switch 56 is mounted to the temple inner surface portion 118 adjacent to the hinge 112. A switch cover 109 mounts to the temple arm member 102 by any suitable mechanism, including adhesive, fasteners, or the like, to cover switch electronic components 61 and retain the switch electronic components 61 in the compartment 54. Preferably, an inwardly facing surface of the switch cover 109 is substantially flush with the raised portion 53 of the temple arm inner surface 188 so that the raised portion 53 has a substantially flat configuration. The switch cover 109 includes an opening 69 therein for an actuator portion 59 of the switch 56 to project therethrough to be accessible by a wearer of the glasses 100. The opening can be configured to be operable for any suitable switch including, for example, an elongate opening for a slide switch, a rounded opening for a rotary switch, and the like. In particular, the hinge 112 pivotably connects a front temple part 58 to an outer or edge cross-frame member part 60 with a pin or screw fastener 61. In order to preserve space and minimize the length of the electronic assembly 50, the switch 56 can be placed in a vertical relation with the temple part 58 of the hinge 112. In the illustrated form in FIGS. 2-4, the switch 56 is positioned above the hinge 112 adjacent a forward end surface 114 of the temple arm member 102 and adjacent an upper surface 62 of the temple arm member 102. Accordingly, the temple part 58 of the hinge 112 is adjacent a lower surface 64 of the temple arm member 102. So configured, the switch 56 is positioned to be manipulated by an index finger of the wearer to control power to the light sources 106. Alternatively, the switch 56 can be positioned adjacent the lower surface 64 of the temple arm member 102 and the temple part 58 of the hinge 112 can be positioned above the switch 56 and adjacent the upper surface 62 of the temple arm member 102.

Figure 6:
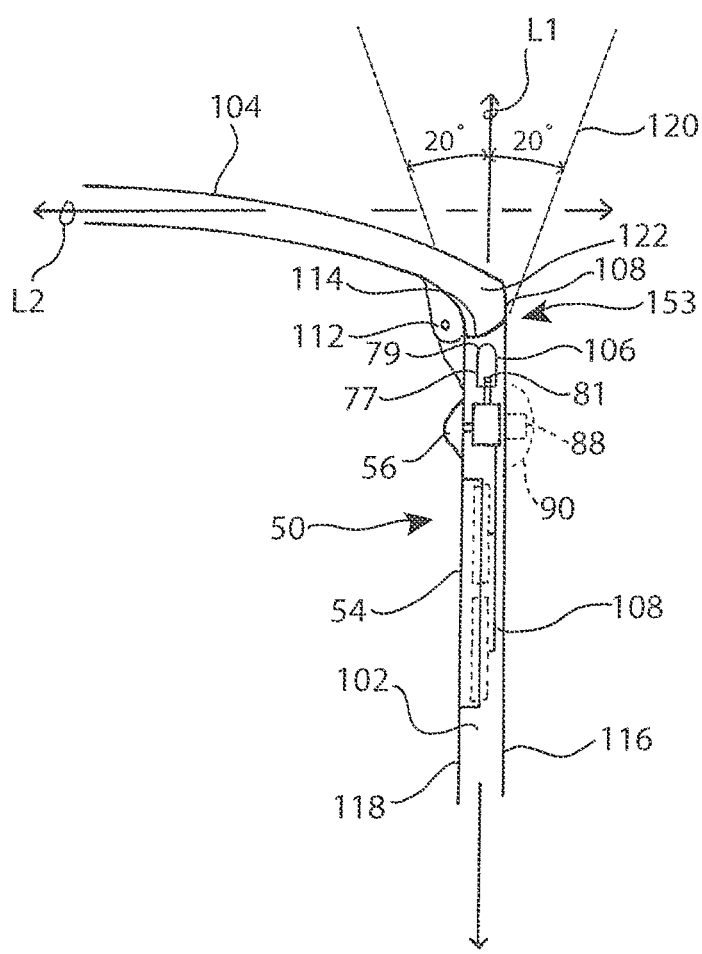
FIG. 6 is an enlarged fragmentary plan view showing a different position of a LED relative to the eyeglass frame members with a light cone projecting therefrom.
Figure 7A:
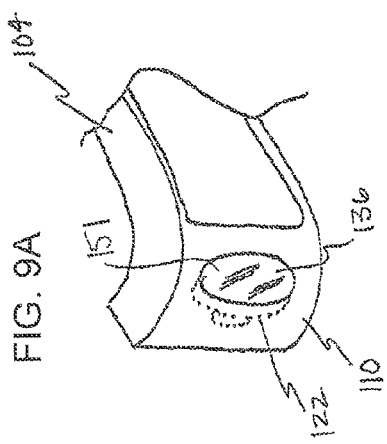
FIG. 7A is a top cross-section view of a cross-frame member and a temple arm member in the use configuration with a light source mounted to the temple arm member and a pass-through portion of the cross-frame member having coaxial cant axes.

FIG. 6 illustrates an alternative location for a switch 88 to control power to the light sources 106. As illustrated, the switch 88 is mounted to the outer surface 116 of the temple arm member 102, such as mounted on or adjacent the forward end portions 114 of the temple arm member 102. This advantageously positions the switch 88 adjacent the power source compartment 54 and the light source 106. The switch 88 may be a pushbutton switch, a slide switch, a rotary switch, or the like. Preferably, the switch 88 includes a protective cover 90, such as composed of a plastic material, a metal material, or a combination thereof. In one form, the protective cover 90 operatively couples to the switch 88 to act as an actuator or couple to an actuator, so that the protective cover 90 can be manipulated to operate the switch 88. This can be achieved by the protective cover 90 being in a sliding relation to the outer surface 116 of the temple arm member 102 for a slide switch, having a depressible or flexible region for a pushbutton switch, or being in a rotating relation to the outer surface 116 of the temple arm member 102 for a rotary switch. The protective cover 90 can also provide protection for components of the switch 88, which can result from regular wear and tear or dropping the illuminated eyewear 100. Advantageously, the protective cover 90 can also be configured to partially or fully conceal the presence of the switch 88, so that the illuminated eyewear 100 retains the appearance or aesthetic of traditional eyeglasses.

In one form, the protective cover 90 can also be utilized to display alphanumeric or graphical content, such as a company logo, slogan, trademark, or the like. The positioning of the protective cover 90 on the outer surface 116 of the temple arm member 102 prominently displays such content outwardly when the illuminated eyewear is in the open or use configuration, which can provide advertising or promote brand recognition. In another form, the protective cover 90 can be positioned on the outer surface 116 of the temple arm member 102, such as in a position generally opposite the switch 56, to provide outside protection for the switch 56 and/or other components of the electronic assembly 50.

By one approach, the power source compartment 54 has a narrow width relative to the thickness of the temple arm 102 and is positioned between the inner surface portion 118 and the outer surface portion 116. This narrow width compartment 54 enables the temple arm members 102 to maintain a relatively thin shape, which can provide a more comfortable fit on a wearer's head than thicker temple arm members. The power source compartment 54 is further positioned adjacent to the temple part 58 of the hinge 112 and can be partially recessed into the temple arm member 102. In the illustrated form, the compartment 54 includes an outwardly extending rim 65, which spaces the raised portion 53 above the lower flat portion 51 of the temple arm inner surface portion 118. The depth of the compartment 54 is configured to house a pair of batteries 66 to power the light sources 106, such as a pair of disc-shaped coin cell batteries, in a longitudinal and non-overlapping, side-by-side relation, so that main surfaces of the batteries 66 face the inner surface portion 118 and the outer surface portion 116 of the temple arm members 102. By another approach, the compartment 54 can be configured to receive a rechargeable battery therein, such as a battery with a generally rectangular configuration. The compartment 54 can also include a recess 67 to partially receive the switch 56, such as electrical contacts and/or connecting wires of the switch 56 that are electrically coupled to the batteries 66 and the light source 106. So configured, the power source compartment 54 substantially hides the battery or batteries 66 and the switch 56 from view when the illuminated eyewear 100 is worn.

Alternatively, the enlarged portion 108 of the temple arm member can extend, with respect to the intermediate and rear portions 34, 36 of the temple arm members 102, in at least two directions orthogonal to each other and orthogonal to the longitudinal axis L1 of the temple arm members 102, such as in a lateral direction generally transverse to the inner and outer surface portion 118, 116 and in a vertical direction generally transverse to the upper and lower surface portions 121, 123. In this alternative arrangement, the compartment 54 may be thicker and taller than the remainder of the temple arm extending rearward therefrom, and could therefore support the pair of batteries 66 in a stacked or overlapping relation or a thicker rechargeable battery therein. Also, only one battery 66 could be utilized.

When the batteries 66 are in the longitudinal side-by-side relation shown in FIGS. 3 and 4, the compartment 54 is divided into two bays 68, each preferably having the rim 65 extending at least partially thereabout and configured to support and laterally enclose a single battery 66. The far bay 68 includes a recess 70 in a bottom surface thereof configured to support a contact 72, such as a blade connector, coupled to the switch 56. The contact 72 can be secured in position, such as by a friction fit, by inserting a vertical contact wall portion 74 into a groove or grooves formed in the rim 65. The contact 72 is electrically connected to the switch 56, which as stated above, is attached to the contact 57 of the light source 106. Specifically, a wire 76 extends from the contact 72 to the switch 56 by being secured within a space provided within the compartment 54 above or below the other bay 68, preferably depending on the positioning of the switch 56. The wire 76 can be at least partially covered by an insulating material or jacket along at least a portion of its length. As illustrated, the contact 72 is configured to contact the cathode of the battery 66. The other bay 68 may be positioned adjacent to the switch 56 and include a recess 78 in a bottom surface thereof configured to support a second contact 80 of the light source 106. As illustrated, the contact 80 is one of the elongate leads stemming from the light source 106 and is received in an elongate recess 78 to be configured to contact the anode of the other battery 66. So configured, the cathode of one battery 66 is coupled to the switch 56, which is coupled to the light source 106, and the anode of the other battery 66 is coupled directly to the light source 106. This configuration allows the switch 56 to control power to the light source 106 to turn it on and off. While one specific configuration of the contacts 72, 80 and batteries 66 are illustrated, the components may also be reversed if so desired.

By one approach, the raised portion 53 of the inner surface portion 118 includes a removable cover 82, as shown in FIGS. 2 and 3, configured to securely fit over the compartment 54 to secure the batteries 66 within. The cover 82 may optionally include biasing members such as springs on an inner surface thereof to apply outward pressure on the batteries 66, so the batteries 66 are tightly held against the contacts 72, 80. The cover 82 is secured to the compartment 54 by a tongue and groove mechanism including portions or projections of depending sides and the distal end of the cover 82 that cooperate with edges or slots provided on or in the rim 65. Other suitable securing mechanisms can also be utilized. In the illustrated form, the cover 82 is formed from metal (as opposed to the preferred plastic of the eyeglasses and temple portions thereof) in order to limit the thickness of the temple arm member 12. A plastic cover could have an increased thickness, which could detract from the thin configuration of the temple arm members 102, but could be used if sufficiently thin and strong.

Figure 22:
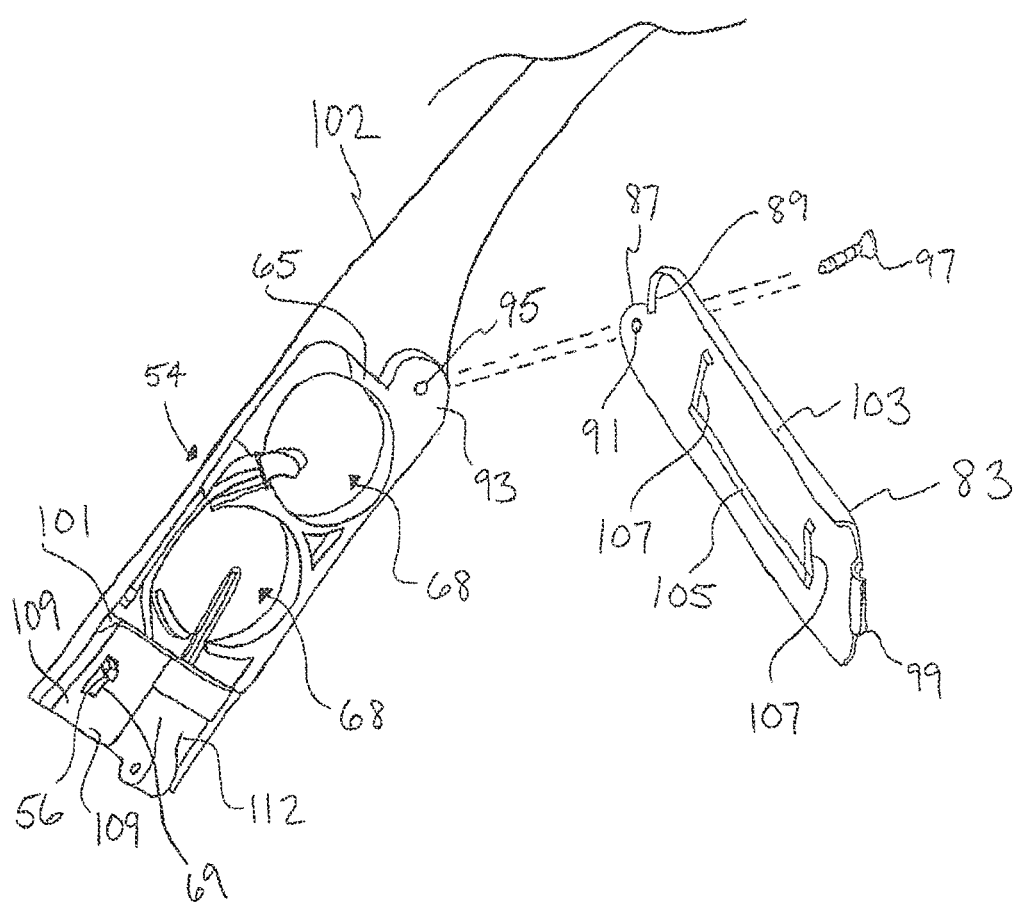
FIG. 22 is an enlarged exploded view of a temple arm member showing a power source compartment in the temple arm member and a power source compartment cover to be pivotably mounted to the temple arm member.

An alternative cover 83 is shown in FIG. 22 in combination with the temple arm member 102. The temple arm member 102 illustrated in FIG. 22 is substantially similar to the temple arm member 102 as described above with respect to the compartment 54, with differences described below. As shown, the cover 83 includes a tab or projection 87 that projects rearwardly from a rear end 89 of the cover 83 at the lower portion thereof. The tab 87 includes a rounded perimeter edge, but can take other shapes as desired. An attachment opening 91 extends through the tab 87 so that the cover 83 can be attached to the temple arm member 102. The temple arm member 102 includes a corresponding mounting tab or protuberance 93 with a corresponding threaded opening or bore 95 therein that is configured to align with the opening 91 in the cover tab 87 when the cover 83 is mounted to the temple arm member 102 with a suitable attachment device, such as a screw fastener 97, pin, or the like. The opening 91 is oversized relative to the screw fastener 97 so that the screw fastener 97 extends therethrough, but is only threaded into the threaded bore 95. So configured, the cover 83 can be pivotably attached to the temple arm member 102, and as such can be pivoted between a closed position covering the bays 68 of the power source compartment 54 and holding the batteries 66 therein, and an open position exposing the bays 68 sufficiently to allow the batteries 66 to be removed and replaced.

To hold or retain the cover 83 in the closed position, the cover 83 includes a thin latch member 99 bent and extending from the forward end of the cover 83 to be offset therefrom, and the temple arm member 102 includes a corresponding recessed slot 101 sized to receive the cover latch 99 therein when the cover 83 is pivoted to the closed position. In the illustrated form, the slot 101 is provided between the temple arm member 102 and a rear edge portion of the switch cover 109 mounted to the temple arm member 102.

In order to minimize the thickness of the temple arm member 102, the cover 83 preferably has a thin, substantially flat configuration, which by one approach is enabled by using a strong material, such as a metal to construct the cover 83. The cover 83 can further include a thin lip 103 that projects inwardly toward the temple arm member 102 to overlap the compartment rim 65 along a top and partially along the side of the compartment 54 to a positioned adjacent to the lower cover tab 87. Advantageously, the lip 103 also acts as a stop surface when the cover 83 is fully rotated to the closed position because the lip 103 of the cover 83 abuts and rests against an upper surface of the rim 65 when the cover 83 is fully pivoted to cover the compartment 54. As shown, the cover 83 can further include a contact 105 mounted to the interior surface 111 thereof so as to form an interior surface of the battery compartment 54 facing the batteries 66 with the contact 105 having two inwardly projecting arms 107. The contact arms 107 are positioned to contact, and therefore electrically couple, the exposed main faces of the batteries 66 in the bays 68 when the cover 83 is in the closed position. Preferably, the contact arms 107 are biased to project inwardly to ensure secure contact with the battery main faces and also to urge the cover 83 outwardly due to abutment with the battery main faces. The outward force causes the latch 99 to tightly frictionally engage against the switch cover portion 109 along the slot 101 to resist the cover 83 from pivoting to the open position.

Figure 20:
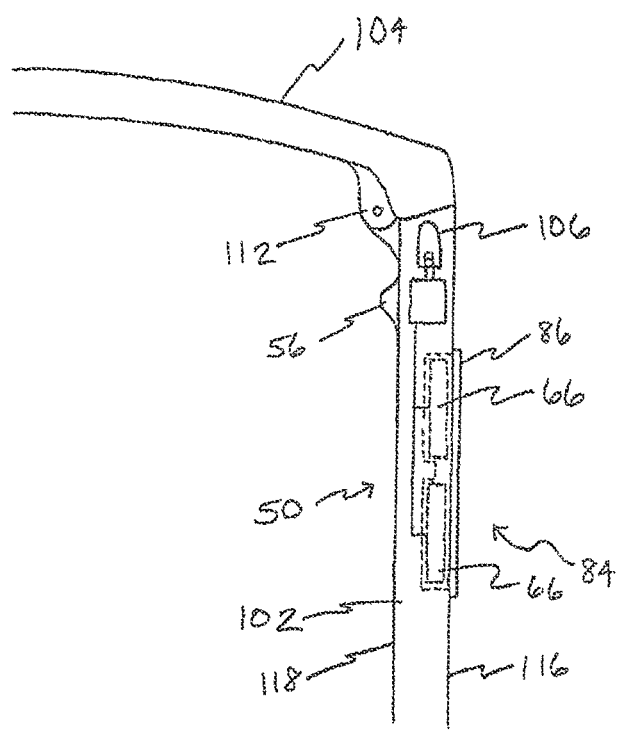
FIG. 20 is a fragmentary top plan view of illuminated eyewear showing a cross-frame member and a temple arm extending rearwardly therefrom and having a power source compartment recessed in an outside surface thereof.

An alternative power source compartment 84 is illustrated in FIG. 20. The alternative power source compartment 84 in this form is disposed between the inner and outer surfaces 118, 116 of the temple arm member 102 with an opening 85 at the outer surface 116 so that the compartment 54 is recessed in the outer surface 116 allowing the batteries to be easily accessed while wearing the glasses 100 or while the temple arm members 102 are pivoted to the stored configuration. The alternative power source compartment 84 includes structure similar to the power source compartment 54 discussed above, such as the structure to house the power source 66, such as a pair of batteries in longitudinal side-by-side orientation or a rechargeable battery, and the components necessary to supply power from the batteries to the light source 106 including wires, contacts, and the like. Other components of the electronic assembly 50, such as the switch 56 can be mounted to the inner surface 118 as discussed above, or alternatively can be mounted to the outer surface 116 in a position adjacent the alternative power source compartment 84. The alternative power source compartment 84 preferably includes a removable cover 86. The removable cover 86 may be structured similarly to the cover 82 or 83 as discussed above, such as secured to the temple arm member 102 through a tongue-and-groove construction.

The cover 86 can alternatively include pivotable or rotatable structure, such as hinges or the like, along one of the edges of the compartment 54 so that the cover 86 can be pivoted about the hinge to selectively expose and close the compartment 54. For example, a hinge can be longitudinally disposed along the upper or lower edge of the compartment and the cover 86 can be pivoted upward or downward respectively above the hinge. In another example, the hinge can be disposed generally orthogonal to the temple arm axis L2 on the forward or rearward edge of the compartment and the cover 86 can be pivoted forwardly or rearwardly respectively about the hinge. The cover 86 may further include a biasing member, such as a spring, so that the cover 86 is biased to the closed position.

In the form illustrated in FIG. 1, each temple arm member 102 houses at least one light source 106 at an enlarged forward portion 108 thereof. Alternatively, the illuminated eyewear 100 could utilize one, or more than two light sources 106. The light sources 106, as discussed above, are preferably LEDs. In one aspect as discussed in more detail hereinafter, the light sources 106 can be canted inwardly and/or downwardly at angles that allow the light cones of the light sources 106 to intersect at a viewing or reading area forwardly of the wearer. By directing light automatically to this viewing area when the lighted eyeglasses 100 are worn without requiring adjustments of the lights, a wearer of the illuminated eyewear 100 has little need to turn, tilt, or otherwise maneuver the positioning of his/her head to orient the light into a viewing area.

In the illustrated form, the cross-frame member 104 of the illuminated eyewear 100 includes end or outer portions 110 at either side of the intermediate bridge portion 20. Other configurations for the front support 104 could also be employed, however, as has been previously discussed. The end portions 110 pivotably connect to the temple arm members 102 by hinges 112. When pivoted to an open or use configuration as shown in FIG. 1, the temple arm members 102 extend rearwardly from the front support 104 and preferably generally perpendicular to the cross-frame member 104 along fore-and-aft axes L1 that are generally orthogonal to a lateral axis L2 along which the cross-frame member 104 generally extends (see, for example, FIG. 5). The temple arm members 102 are also configured to pivot or shift to a collapsed, closed, or storage configuration where each temple arm member 102 extends laterally along the L2 axis adjacent to the cross-frame member 104.

The light sources 106 can be canted with respect to the temple arm axis L1 and the cross-frame axis L2 so that the light sources 106 direct light to a desired viewing area forwardly of the light glasses 100 without requiring a wearers to tilt or shift their heads. For example, the light sources 106 can be canted downwardly with respect to the temple arm axis L1 to illuminate in area forwardly and below the glasses 100, and can be canted inwardly with respect to the temple arm axis L1 so that the light cones of the light sources 106 converge on a generally common viewing area before they normally would (i.e., closer to the wearer such as at reading distances of approximately 10 inches to approximately 18 inches if the axes of the light cones were coaxial with the respective temple arm axes L1. Additional disclosure directed to canting light sources for lighted eyewear is described in U.S. application Ser. No. 12/895,456, which is hereby incorporated herein. By another approach, the light sources 106 can be canted at different angles to illuminate two or more different viewing areas. For example, one light source can be canted inwardly and downwardly with respect to the temple arm axis L1 to illuminate the viewing area and another light source 106 can be uncanted or include less of an inward cant with respect to the temple arm axis L1 to illuminate an area forwardly of the glasses and at a farther distance relative thereto.

As illustrated, each temple arm member 102 includes the enlarged portion 108 adjacent a forward end surface or portion 114 of each temple arm member 102, where the structure rearward of the enlarged portion 108 can be configured as discussed above with the glasses 10. In this embodiment, the temple arm members 102 include an outer surface portion 116 and an inner surface portion 118. The outer and inner surface portions 116, 118 are illustrated as having a generally flat configuration. Preferably, and as shown in FIG. 1, the flat configuration of the outer surface portion 116 is entirely unbroken, preserving a traditional eyeglass appearance. Alternatively, however, the outer surface portion 116 can have projections therefrom, such as a member at least partially enclosing the light source 106, or other mechanical, electrical, or aesthetic features.

Figure 5:
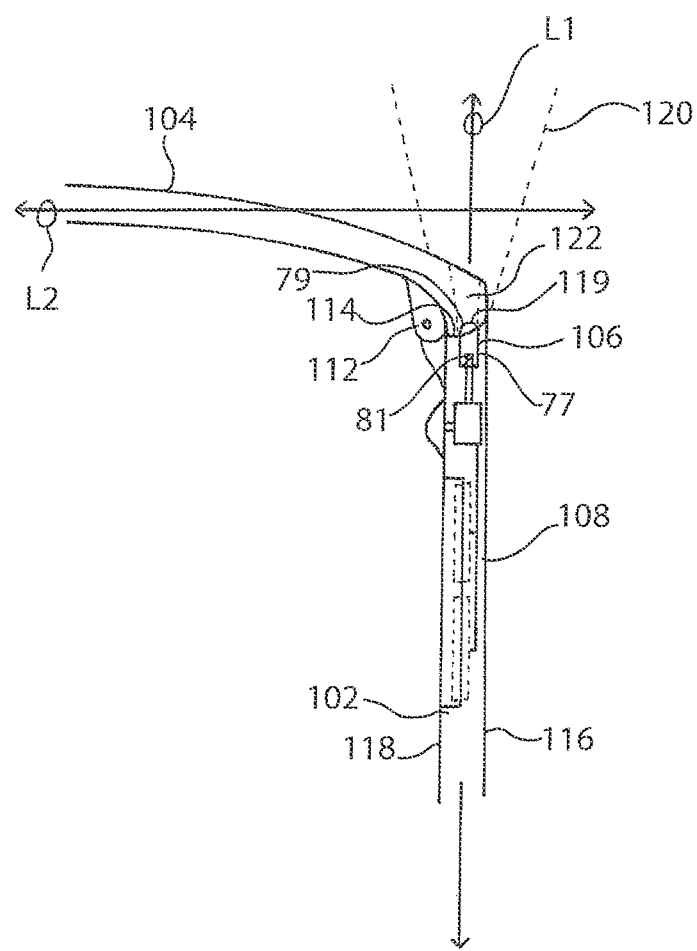
FIG. 5 is an enlarged fragmentary plan view showing positioning of a LED relative to the eyeglass frame members with a light cone projecting therefrom.

In this form, the light sources 106 are preferably mounted at least partially within the enlarged portions 108 of the temple arm members 102 recessed in the forward surfaces 114 thereof. By one approach, each light source 106 is mounted between the outer and inner surface portions 116, 118, such as mounted in a manner to not disturb the flat configuration of the outer and inner surface portions 116, 118. As illustrated in FIGS. 5 and 6, the light sources 106 are recessed in relation to the lens areas 21 so that the light sources 106 are mounted rearwardly with respect to the lens areas 21 along the temple arm axis L1. With this configuration, when the lighted glasses 100 are worn, the light sources 106 lie laterally adjacent to a wearer's eyes rather than forwardly of the wearer's eyes like the lens areas 21. Due to this, the inner surface portions 118 of the temple arm members 102 preferably are opaque or light blocking adjacent the light sources 106 so that unwanted stray light or glare is substantially prevented from passing through the inner surface portion 118 of the temple arm members 102 and into the eyes of a wearer and/or into the lenses 28 of the illuminated eyewear 100. Alternatively, the light sources 106 could be mounted, as discussed above, at least partially within a projection or tubular member extending slightly outwardly from the outer surface portion 116 of each temple arm member 102. As shown, each light source 106 is mounted generally centered vertically within the temple arm member 102 where it is generally intermediate upper and lower surfaces 121, 123 between the outer and inner temple side surfaces 116 and 118, however, the light source 106 can be mounted above or below the illustrated position as required or desired.

In one form, as illustrated in FIG. 5, a forward lens portion 119 of the light source 106 extends beyond the forward end surface 114 of the temple arm member 102. In a slightly different form, the light sources 106 may be received entirely within the temple arm members 102, as illustrated in FIG. 6. In either configuration, the light sources 106 are housed to be fixed at least partially in the temple arm members 102 to pivot therewith. As the temple arm members 102 are pivoted to the use configuration, the light sources 106 are oriented to project light to a position generally forward of the illuminated eyewear 100. When in the use configuration, the end portions 110 of the cross-frame member 104 are located at least partially within the light cones of the light sources 106 as can be seen in FIGS. 5 and 6, and is configured so that the illumination projects through the cross-frame member 104, and in particular, through a pass-through portion 122 of the cross-frame end portions 110. In these forms, the pass-through portion 122 is an opening or bore (FIG. 5), or is constructed of a material, such as acrylic, polycarbonate, or the like, that allows the light sources 106 to project light forwardly of the illuminated eyewear 100 through the cross-frame member 104 (FIG. 6), while at the same time also allowing the light sources 106 to be at least partially hidden from view from a casual observer. In one approach, the pass-through portion 122 is not refractive, so that a projection path of light emitted by the light sources 106 stays substantially constant as the light passes through the pass-through portion 122 to shine forwardly of the illuminate eyewear 100.

In the form illustrated in FIG. 6, the light source 106 is received within the temple arm member 102 as discussed above. To this end, the pass-through portion 122 may also include the end portions 108 including the forward end surfaces 114 of the temple arms 102. Accordingly, in order to allow light projected from the light source 106 to exit from within the temple arm member 102, the forward end 108 of the temple arm member 102 located forwardly of the light source 106 can be transparent or translucent, can include a bore or other opening that opens to the forward end surface 114, or the like. So configured, the light source 106 can be received and hidden entirely within the temple arm member 102 to be recessed back from the forward end surface 114 of the temple arm member 102, while still projecting light forwardly out from the temple arm member 102 through the pass-through portion 122 discussed in more detail below.

The illuminated eyewear 100 as configured in FIGS. 1, 5, 6, and 21 orient the cross-frame member 104, and specifically the end portions 110 thereof, forwardly or in front of the light sources 106 mounted to the temple arm members 102 when in their open, use configuration so the end portions 110, if unbroken and opaque, would substantially block the light cone 120 of the light sources 106. Accordingly, the pass-through portion 122 of the cross-frame member 104 of each of the end portions 110 allows at least a portion of the light cone 120 to shine through the cross-frame member 104 forwardly of the illuminated eyewear 100.

Example pass-through portions 122 are illustrated in FIGS. 7-9B. A first form of the pass-through portion 122 can be provided by using a translucent or transparent material portion for some or all of the cross-frame member 104. This would allow the light sources 106 to shine light through the portion of the cross-frame portion 104 that intersects the light cone of the LED light source 106. Alternatively, in a second form, illustrated in FIG. 7, a light receiver portion 124 is included at the end portions 110 of the cross-frame member 104. The receiver portion 124 can be formed by any suitable means, such as drilling to remove material from the cross-frame member 104 to form a cavity 125 in the end portions 110, molding the cross-frame member 104 to include the cavity 125, or the like. As illustrated, the receiver portion 124 is in the form of a bore, tunnel, or pipe. In the simplest form, the receiver portion 124 can be left without additional features, providing a conduit through which light emitted from the light sources 106 can shine forwardly of the illuminated eyewear 100. As such, the cavity 125 includes a rear aperture 127 in the rear surface 129 of the cross-frame member 104. In the form where the temple arm members pivot with respect to the cross-frame member, the rear aperture 127 and at least a rear portion of the cavity 125 can be oversized relative to the diameter of the light source LED 106 and specifically the cylindrical and dome cap portions 77, 79 portions thereof so that the light source LED 106 can be pivoted partially into the cavity 125 when the temple arm members 102 are pivoted to the use position without abutting or contacting the cross-frame member 104.

All pass-through portions 122 described herein can also be positioned to accommodate canting of the light sources as discussed above. Specifically, the pass through portion accommodates the canting of the light sources 106 by also canting in a similar manner as the light sources described above. For example, the pass-through portion 122 can be canted inwardly with respect to the temple axis L1 and/or downwardly with respect to both the temple arm axis L1 and the cross-frame axis L2, which is generally transverse to the temple axis L1 when the temple arm members 102 are pivoted to the open or use configuration. The cant of the pass-through portion 122 can be utilized to generally conform to a cant of the light sources 106, so that the pass-through portion 122 can be axially centered with the respective light source 106. In other words, central axes C1 of both the LED light sources 106 and the corresponding pass-through portion 122, respectively, can be the same. The pass-through portions 122 can then be shaped to be larger or smaller than the light cone projected from the light source or include coatings or layers therein to focus or frame light projecting from the light sources 106 to the viewing area as discussed above.

Optionally, an inner surface 134 extending about the receiver portion 124 can include a material or coating on at least a portion thereof to optimize the light output from the light sources 106 and minimize wasted light. The material or coating can be any suitable reflective material or have a suitable reflective surface, such as a silver coating, a nickel coating, a lithium silver plating, nickel lithium planting, or the like. In another form, if the cross-frame member 104 is composed of an at least partially light transmissive material, the inner surface 134 extending about the receiver portion 124 may alternatively, or in addition to the above, include a light blocking layer or coating configured to reduce the amount of unwanted stray light projecting from the light sources 106 through the cross-frame member 104 into the eyes of the wearer or causing glare on the lenses 28.

Alternatively, the receiver portion 124 can include a light pipe, fiber optics, or other light transmissive material 140 mounted in the receiver portion 124 operable to direct light through the cross-frame member 104 or allow light to be directed therethrough. These features allow the light emitted by the light sources 106 to pass-through the cross-frame member 104 while also minimizing the loss of light.

Figure 8A:
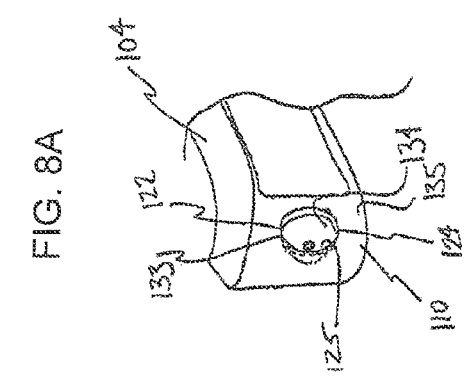
FIG. 8A is an enlarged perspective view of a cross-frame member showing a different pass-through feature on the end portion thereof and an associated insert.
Figure 8B:
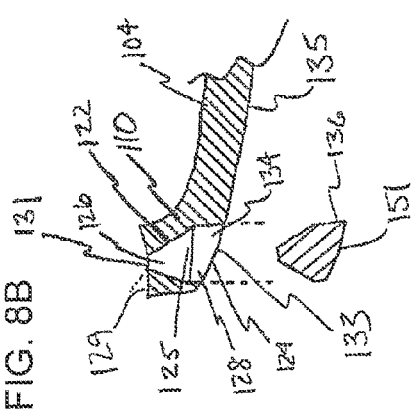
FIG. 8B is an enlarged fragmentary plan view in section showing the cross-frame member and insert of FIG. 8A.

As illustrated in FIGS. 8A and 8B, in a third form, the receiver portion 124 includes a rearwardly extending frusto-conical cut-out portion 126 where a base cut-out frustum portion substantially axially aligns with a forwardly positioned generally cylindrical cut-out portion 128. The frusto-conical portion 126 extends and opens to the rear surface portion 129 of the cross-frame member 104 to create a rear aperture 131 oriented to generally align or overlap coaxially with the light source 106 mounted at least partially within the temple arm member 102 when the temple arm member 102 is in the open or use configuration. The front cylindrical portion 128 is preferably generally centered along the light source 106 axis C1 and opens at the front surface 135 of the cross-frame member 104 to create a forward aperture or opening 133 therein. Preferably, the diameter of the rear aperture 131 is sized to substantially match or be slightly larger than the diameter of the lens 75 of the light source 106. This configuration minimizes wasted light because a majority of light projected from the light source 106 is received within the light reception portion 124. Additionally, especially in the form shown in FIG. 5, the rear aperture 131 can partially receive the light source 106 therethrough. For example, the diameter of the light source lens 75 can be approximately 3 mm and the diameter of the aperture 131 of the frusto-conical portion 126 can be approximately 3 mm or larger. The frusto-conical portion 126 can then taper out to a diameter of 5 mm or larger where the frusto-conical portion 126 meets the cylindrical cut-out portion 128. The cylindrical portion 128 would then substantially maintain this diameter to the front surface 135 of the cross-frame member 104. A frustum and cylinder combination has been discussed for the cut-out 126, but other suitable configurations can be utilized, such as a frustum, cylinder, pyramid, prism, cuboid, sphere, prolate ellipsoid, a combination of one or more of the shapes, a combination of differently sized shapes, portions of the shapes, or the like.

Figure 9A:
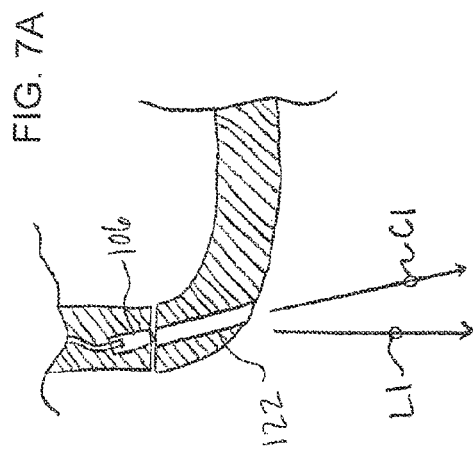
FIG. 9A is an enlarged perspective view of a cross-frame member showing another pass-through feature on the end portion thereof and an associated insert.
Figure 7:
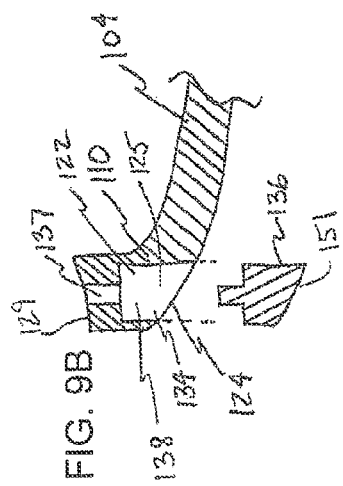
FIG. 7 is an enlarged perspective view of a cross-frame member showing a pass-through feature formed at an end portion thereof.
Figure 9B:
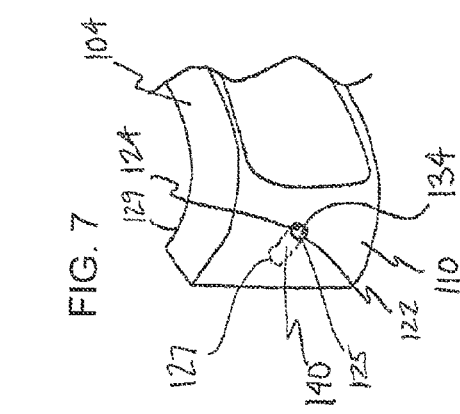
FIG. 9B is an enlarged fragmentary plan view in section showing the cross-frame member and insert of FIG. 9A.

In addition to the above, the cross-frame member 104 can optionally include an insert 136 configured to mate and fit within the receiver portion 124 so that the front surface 135 of the cross-frame member 104 appears substantially unbroken (see FIGS. 8B, 9A, and 9B). The insert 136 can be substantially the same shape and size of the receiver portion 124, or can be configured to fit within a smaller portion, such as a front or rear region of the receiver portion 124. Preferably, the insert 136 is sized and configured so that when fit in the receiver portion cavity 124 its forward surface 151 is flush with the cross-frame front surface 135. The insert 136 can be secured within the receiver portion 124 by any suitable mechanism, such as adhesive, press fit, threads, fasteners, heat seals, or the like. In this form, the insert 136 is configured so that light from the light source 106 is projected through the insert 136 forwardly of the illuminated eyewear 100. Accordingly, the insert 136 can be formed from any suitable translucent or transparent material such that at least some of the light from the light source 106 filters or is projected through the insert 136. At the same time, the insert 136 can be constructed of a material that blends in with the material of the cross-frame member to maintain the general appearance of eyeglass frames. The insert 136 can also be refractive to focus or spread the light cone emitted by the LED as desired, diffusing to soften the light, and/or can be colored to project a colored light forwardly of the glasses 100.

Figure 21:
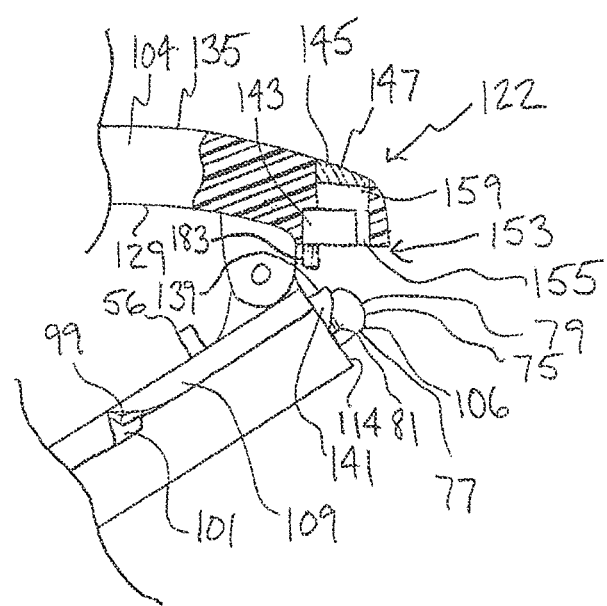
FIG. 21 is an enlarged fragmentary plan view partially in section of illuminated eyewear showing a cross-frame member with a pass-through portion and a temple arm member pivotably attached to the cross-frame member having a light source mounted to project beyond a forward end thereof.

In yet another form as illustrated in FIG. 21, the pass through portion 122 is formed as a through-bore that has a generally cylindrical configuration and extends through the cross-frame portion 104 to open at the rear surface 129 and the front surface 135 thereof. The pass through portion 122 is oriented so that the forward portion of the lens 75 of the LED light source 106 that projects forwardly beyond the front end surface 114 of the temple arm member 102 extends at least partially into the pass-through portion 122 when the temple arm member 102 is in the use position. As illustrated, this includes a forward section of the cylindrical base portion 77 and the dome shaped cap portion 79 of the lens 75. As discussed above, at least a rear portion of the pass-through portion 122 can be oversized relative to the diameter of the LED 106, and specifically the cylindrical base portion 77 thereof, so that the LED 106 can be pivoted partially into the pass-through portion 122 to avoid interference with the cross-frame member 104 when the temple arm members 102 are pivoted to the use position.

Figure 23:
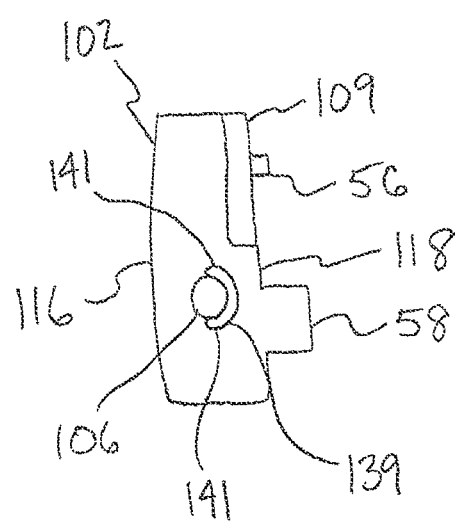
FIG. 23 is an enlarged top plan view of a temple arm member showing a light source mounted to a forward surface thereof and a light block extension extending partially around the light source.

By one approach, the temple arm member 102 can include a light blocking extension 139 that extends forwardly away from the front end surface 114 to extend alongside of the forwardly projecting lens 75 of the LED 106. More specifically, the light blocking extension 139 is in the form of a wall formed to be laterally inwardly of the light source 106 so that it is at least partially between the light source 106 and the inner surface 118 of the temple arm member 102. Preferably, the light blocking extension 139 extends away from the temple front end surface 114 a sufficient distance so as to extend axially beyond the diode 81 of the LED 106. The light blocking extension wall 139 can further include tapering sidewall portions 141 that extend around the lens base portion 77 so that the light blocking extension wall 139 has an arcuate configuration, as shown in FIG. 23. In the illustrated form, the light block extension wraps around at least the inwardly facing half of the lens base portion 77 of the LED 106. So configured, the extension 139 blocks incident light from projecting laterally inwardly through the gap 153 between the cross-frame portion 104 and the temple front end surface 114 when the temple arm member is pivoted to the use configuration to prevent the incident light from shining into the eyes of a wearer of the glasses 100 and/or into the lenses 21 of the glasses 100.

In this approach, the pass through portion bore 122 can include a rear light blocking extension reception portion or recess 143. The reception portion 143 expands the width of the pass-through portion bore 122, in particular the rear portion 155 thereof, to accommodate the extension 139. By a further approach, a translucent or transparent cap 145 can be fit in a forward portion 159 of the pass through portion bore 122. Preferably, the cap 145 has a forward surface 147 that is substantially flush with the front surface 135 of the cross-frame member 104. The cap can be translucent, diffusing, refractive, and/or have a colored tint, as discussed above.

The light blocking extension 139 can alternatively extend rearwardly away from the temple arm end portion 110 to extend alongside of the forwardly projecting lens 75 of the LED 106 mounted to the temple arm member 102. In this form, the extension 139 is in the form of a wall or protrusion. The extension 139 can be configured to abut or be closely adjacent to the forward surface 114 of the temple arm member 102 when the temple arm member 102 is pivoted to the use configuration to block incident light from projecting laterally inwardly through the gap 153 between the cross-frame member 104 and the temple front end surface 114. In a preferred form, the temple arm member 102 can include a pocket or recess in the forward surface 114 thereof and the extension 139 can extend rearwardly from the cross-frame end portion 110 to be received within the pocket when the temple arm members 102 are pivoted to the use configuration. The wall can be arcuate, as discussed above, or can extend generally orthogonal to the temple arm axis L2.

A differently shaped example receiver portion 124 and insert 136 is illustrated in FIGS. 9A-9B. In this example, the receiver portion 124 has differently configured cylindrical portions including a rearward cylindrical portion 137, which can have a circular cross-sectional configuration, and a forward cylindrical portion 138, which can have a generally oval cross-section as illustrated. As discussed above, if desired, the associated insert 136 is configured to fit within the receiver portion 124 and have a matching contour of profile.

Figure 10:
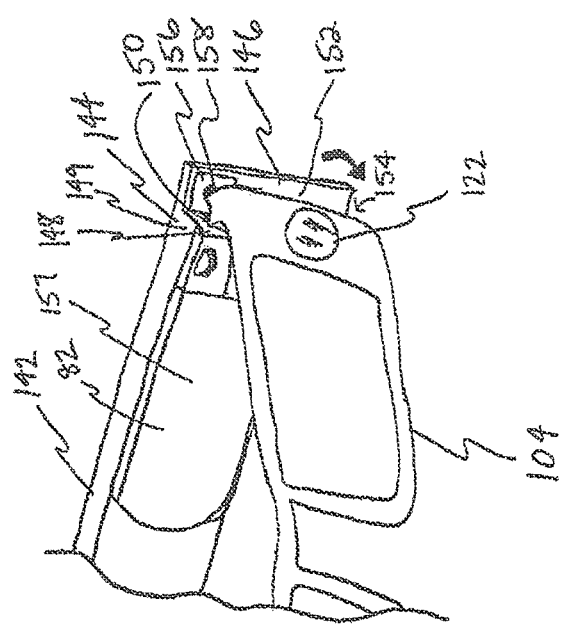
FIG. 10 is a fragmentary perspective view of illuminated eyewear showing a temple arm member in a partially pivoted position and a switch located adjacent a forward inner end of the temple arm member.
Figure 11:
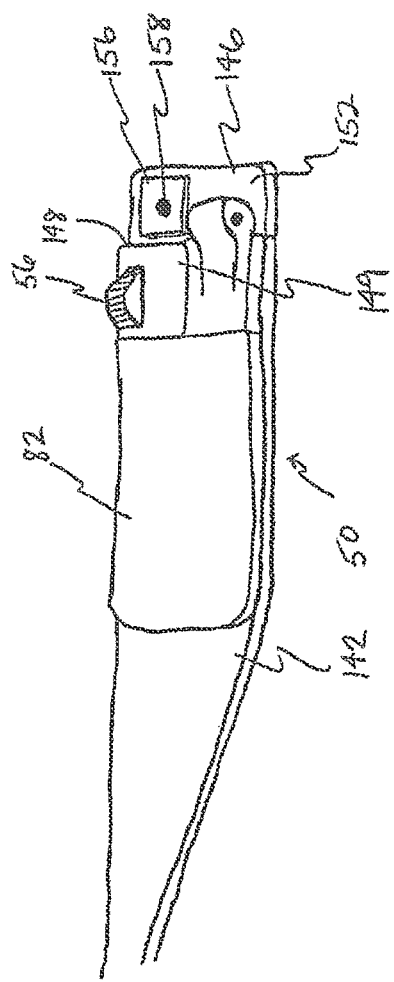
FIG. 11 is a perspective view of the temple arm member of FIG. 15 showing the switch located adjacent the forward inner end of the temple arm member.

Another optional feature for the illuminated eyewear 100 is shown in FIGS. 10 and 11, which depicts an example temple arm member 142. The temple arm member 142, is substantially similar to the temple arm member 102 described above with respect to the illuminated eyewear 100. For example, the temple arm member 142 is configured to pivotably connect to the cross-frame member 104. Accordingly, the differences will be emphasized hereinafter.

The temple arm members 142 can include additional features at the forward ends 144 thereof. As shown in FIG. 10, an extension portion 146 projects forwardly beyond a forward shoulder surface 148 of the temple arm member 142 and extends the outer surface 116 of the temple arm member 102. The forward shoulder surface 148 extends transversely between an inner surface 152 of the extension portion 146 and the inner surface 118 of the temple arm member 102. The forward shoulder surface 148 is formed so as to be closely adjacent to or abut a rearwardly facing surface 150 of the end portions 110 of the cross-frame member 104 when the temple arm members 142 are in the open or use configuration extending generally rearwardly from the cross-frame member 104. The extension portion 146 rotates with the temple arm as the temple arm member 142 is pivoted to the use configuration and is configured to be in interference with the end portions 110 of the cross-frame member 104. Specifically, an interior surface 152 of the extension portion 146 is positioned to be closely adjacent to or contact a side surface 154 of the end portions 110 of the cross-frame member 104. This configuration can advantageously control against over rotation of the temple arm members 142 because the extension portions 146 can provide restricting contact area in addition to the forward shoulder surface 148, which both have interference positioning with the cross-frame member 104 when the temple arm members 142 are fully opened.

This configuration can also advantageously be utilized to provide an additional switch 156 to control power provided from a power source compartment 157 containing a power source therein, such as that described above, to control operation of the light sources 106. As illustrated in FIGS. 10-11, the switch 156 includes a pushbutton actuator 158 and is provided on the interior surface 152 of the extension portion 146. So configured, the pushbutton 158 is arranged and configured to be depressed when the temple arm members 142 are pivoted to the open or use configuration and the side surface 154 of the cross-frame portion 104 engages the extension interior surface 152 and the pushbutton 158 thereon. This advantageously provides a hinge switch without electrical connections spanning between the temple arm members 142 and the cross-frame member 104. Alternatively, the switch 156 may be positioned on other surfaces of the temple arm member 142 that are rotated to contact the cross-frame member 104 when in the use configuration, such as the front surface 148. Advantageously, the switch 156 can be utilized alone or in conjunction with the switch 56 discussed above where the switch 56 on the inner or outer surface 118, 116 of the temple arm member 102 provides a master power switch and the switch 156 on the extension 146 provides a momentary switch that energizes the light source 106 when the temple arm members 102 are pivoted to the open or use configuration whenever the master switch is switched on. Utilizing two switches allows the eyeglasses 100 to be utilized without turning the light sources 106 on, in the configuration of only having a hinge switch, and also protects against the switch 56 inadvertently being switched to an on position and wasting battery life when the eyeglasses are not in the use configuration.

Figure 12:
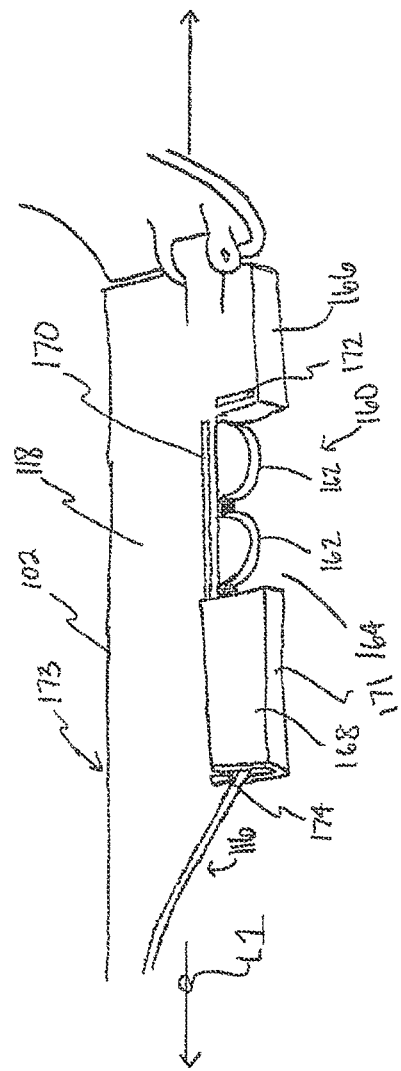
FIG. 12 is a fragmentary perspective view of illuminated eyewear showing a temple arm member including a power source compartment with a movable door.

An alternative configuration for a power source compartment 160 in the temple arm member 102 is shown in FIG. 12. Additional details of the temple arm member 102 have been omitted in the drawing to more clearly display the battery compartment 160, however, it will be understood that the temple arm member 102 can be configured as discussed throughout the specification. As illustrated, the power source compartment 160 of this form includes a space or cavity for a power source 162, such as two coin cell batteries in a side-by-side arrangement or a rechargeable battery. Alternatively, the power source compartment 160 could be sized to support batteries in an overlapping arrangement. An opening 164 to provide access to the power source compartment 160 is located at least partially in a bottom surface 166 of the temple arm member 102. As shown, the opening 164 can be covered by a movable or slideably shifting door or cover 168. By one approach, the door 168 is configured to be movable longitudinally along the axis L1 of the temple arm member 102, such as guided longitudinally by channels or guide tracks 170 in which the door 168 has projections or extensions that would at least partially extend into the guide channel 170, which act to hold the door 168 to the temple arm member 102. In the illustrated form, the opening 164 is a cut-out from the temple arm 102 that extends from the temple arm bottom surface onto the outer and inner temple arm sides 116 and 118. This advantageously allows a bottom surface 171 of the door 168 to be generally flush with the bottom surface 166 of the temple arm member 102 when the door 168 is shifted to the closed position, which preserves the aesthetics of the illuminated eyewear 100 to look like traditional eyeglasses. The opening 164 as described includes portions of the inner and outer surface portions 116, 118 of the temple arm members 102. In an alternative form, however, the opening 164 could also be provided solely on the bottom surface 166 of the temple arm 102 in the form of a slot where the inner and outer surface portions 116, 118 are substantially unbroken by the opening 164. The power source compartment 160 could also be provided to open adjacent or at a top surface 173 of the temple arm member 102 in a similar configuration as describe with respect to the bottom surface 166.

Figure 17:
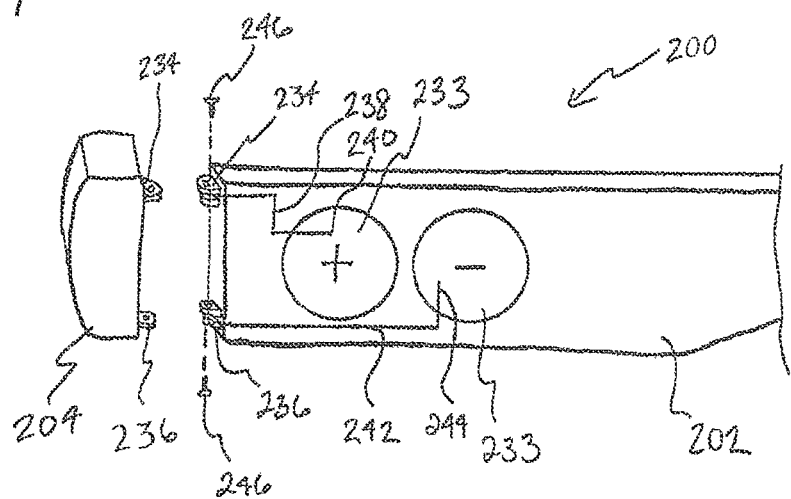
FIG. 17 is a fragmentary perspective view of illuminated eyewear showing electrical connections between a temple arm member and a cross-frame member.

Additionally, the temple arm member 102 and the door 168 may include a detent locking mechanism 172, such as a tongue-and-groove, snap-fit, or the like, in order to securely and releasably hold the door 168 in a closed position where the power source 162 is secured within the power source compartment 160. Then, when desired, the locking force provided by the locking mechanism 172 can be overcome to allow the door 168 to be guided longitudinally along the axis L3 of the temple arm member 102 to an open configuration where the power source 162 is accessible, as shown in FIG. 17. The temple arm 102 may include a stop feature 174, such as an end wall portion of the channels 170, or include an extending stop surface 174, or the like, to provide an abutment surface that prevents the door 168 from traveling too far longitudinally and separating from the temple arm member 102 by rearwardly sliding off of its guides 170 on the temple arm member 102. The door 168, however, can also be configured to be completely removable from the temple arm member 102, if desired, such as by forming the door from an at least partially flexible material so that the door 168 can be flexed or rotated out of the guides 170 or including an indent instead of the stop 174, such that the door 168 can be retained on or be manipulated past the indent and off of the guides 170.

Figure 13:
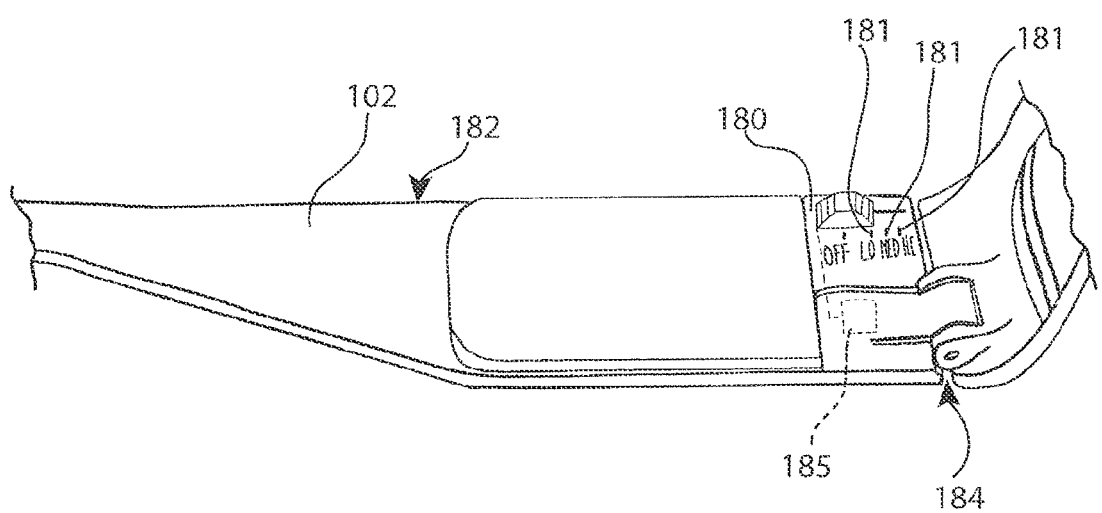
FIG. 13 is a fragmentary perspective view of illuminated eyewear showing a temple arm member including an alternative switch having multiple power level settings.

Another feature for the illuminated eyewear 100 is shown in FIG. 13. For some uses of the illuminated eyewear 100, a variety of light intensity may be desired. Accordingly, the illuminated eyewear 100 may also include a switch 180 such as a slide switch having multiple, different light intensity level or color settings 181. These settings 181 could also provide for power conservation, such as by having various blinking frequencies. As illustrated, the multiple level switch 180 includes high, medium, low, and off settings 181; however, additional levels can be provided if desired. Additionally, the switch 180 is shown in a position adjacent a top surface 182 and forward end surface 184 of the temple arm member 102, but, the switch 180 can be located anywhere on the temple arm member 12 as desired. Other configurations, as discussed throughout the specification can also be utilized. Additionally, the switch 180 may be a pushbutton switch. A circuit board 185 may be electrically connected to the switch 180 and configured to include circuitry that varies light intensity depending on the switch position.

Figure 14:
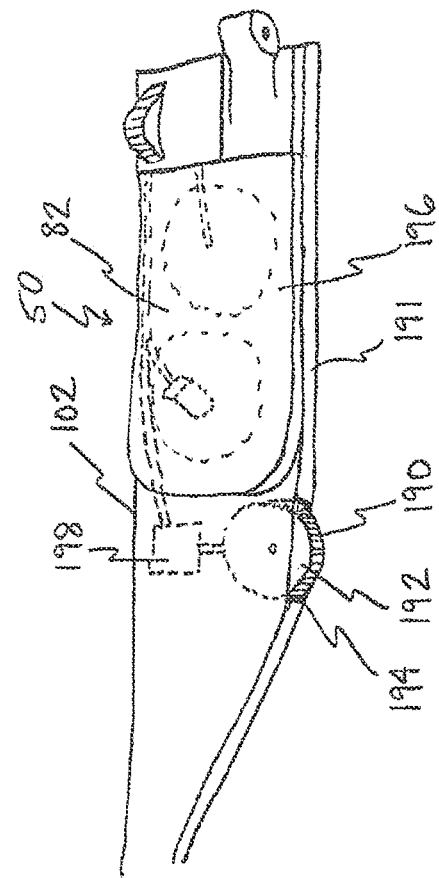
FIG. 14 is a fragmentary perspective view of illuminated eyewear showing a temple arm member having a rotary dimmer switch mounted thereon to control power levels provided to the light source for the eyewear.

An alternative mechanism for varying the intensity of the light from the illuminated eyewear 100 is shown in FIG. 14. In this form, a dimmer switch 190 is mounted on the temple arm member 102 adjacent a bottom surface 191 thereof to control the amount of power provided to the light sources 106. As illustrated, the dimmer switch 190 includes a rotary mechanism 192 including a wheel mounted to the temple arm 102 in a manner so that a portion thereof is exposed to be rotated by a user's thumb or finger to vary the power provided to the light sources 106. For example, turning or rotating the wheel as manipulated by a wearer of the illuminated eyewear 100 controls the brightness of the light sources 106. Alternatively, the rotary mechanism 192 could be utilized to control a frequency at which the light sources 106 blink, which can provide power conservation or freeze frame/strobe light capabilities. In the illustrated form, the rotary mechanism 192 partially extends through an opening 194, such as a slot opening, formed in the bottom surface 191 of the temple arm member 102. Preferably, the rotary mechanism 192 projects a suitable distance, such as in a range of 1/16 inch to 1/2 inch beyond the bottom surface 191. So configured, the rotary mechanism 192 is conveniently located for easy access for manipulation by a wearer of the illuminated eyeglasses 100, such as using a thumb or finger. Additionally, the rotary mechanism 192 can be situated adjacent to a power source compartment 196, such as the battery compartments 54 or 160 discussed above, and be electrically coupled thereto. The dimmer switch 190 may also be electrically connected to a circuit board 198 configured to vary light intensity depending on dimmer switch position. Other suitable methods to provide dimming capabilities could also be utilized.

The illuminated eyewear 200 depicted in FIGS. 15-18 includes one or more light sources 206 received in a cross-frame portion 204 and otherwise includes frame structure similar to that as described above with respect to the illuminated eyewear 100. For example, the illuminated eyewear 200 includes temple arm members 202 pivotably connected to the cross-frame portion 204, as detailed above. Accordingly, the differences will be emphasized hereinafter.

Figure 15:
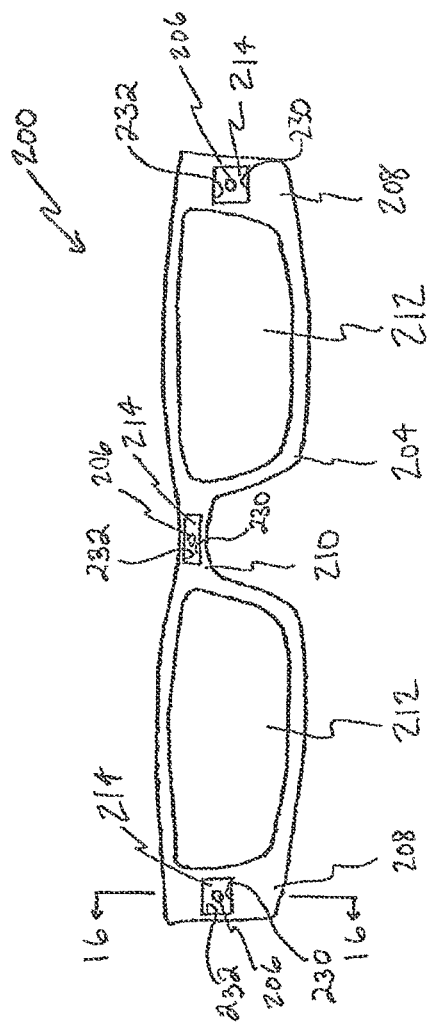
FIG. 15 is a front elevational view of illuminated eyewear showing lights embedded within a cross-frame member.

As shown in FIG. 15, the light sources 206 are mounted to and received within the cross-frame portion 204. FIG. 15 illustrates possible locations for the light sources 206, which can include being mounted to end portions 208 of the cross-frame 204 and/or on a bridge portion 210 of the cross-frame 204, however, one light source 206 can provide satisfactory performance to project light forwardly of a wearer of the illuminated eyewear 200, and as such, any or all of the locations discussed above could be utilized. Additionally, these locations are exemplary only, as any other location on the cross-frame portion 204 could also be utilized, such as above or below lens areas 212.

Figure 16:
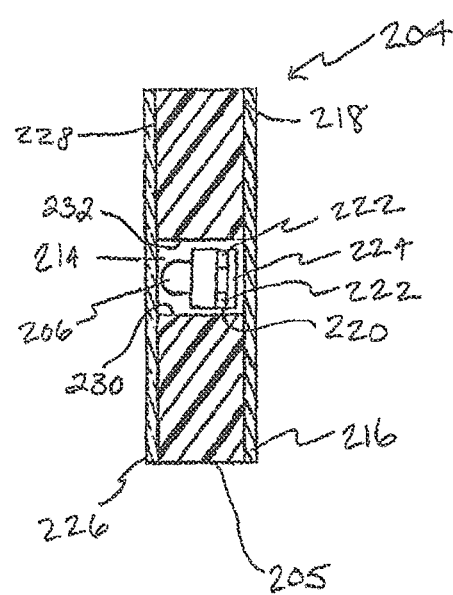
FIG. 16 is an enlarged cross-sectional view of illuminated eyewear showing a cross-frame member having multiple structural layers and a cavity therein within which a light source is received.

FIG. 16 shows a cross-sectional view of the cross-frame member 204 having a laminate construction with one of the light sources 206 enclosed therein. Preferably, the cross-frame member 204 is a plastic laminate of at least three layers; however, other suitable laminate constructions could be utilized, such as metal or combinations thereof. The cross-frame member 204 includes a cavity, cut-out, or opening 214 sized to completely enclose the light source 206 therein. In one example, the light source 206 is a surface mount type LED; however, other light sources could be utilized.

In one form, the cross-frame member 204 is a three layer laminate of a base or internal frame member 205 sandwiched between an outer back layer 216 and an outer front layer 226. By one approach, the cavity 214 is formed in the internal base layer 205. The outer back layer 216 can include a thin laminate, coating, layer, paint, lacquer, or the like, that can be applied on a back surface 218 of the base cross-frame member 205. The back layer 216 generally forms a rear surface of the cavity 214 to which the light source 206 can be mounted. This structure allows the light source 206 and electrical connections 220 to be positioned within the cavity 214 and then be at least rearwardly secured to the back layer 216, such as by adhesive. Additionally, the back layer 216 can be opaque, which can then block incident light from the light source 206 from shining backwards into the eyes of a wearer or to areas that are within the wearer's peripheral vision, or illuminating the back layer 216 which can be distracting and annoying for a wearer. The electrical connections 220 can include electrical contacts 222 electrically connected to a flexible printed circuit board 224, a pair of wires, leads, or the like. To this end, the eyewear 200 may optionally embed all electrical components to power the light source 206 in the front frame 204, such as batteries, switches, and other components all electrically connected by wires or the like. Alternatively, some of the electrical components can be provided in the temple arm members 202 and the electrical connections 220 can span the connection between the temple arm members 202 and the cross frame member 204.

The illuminated eyewear 100 may further include the front layer 226 to cover the forward opening of the cavity 214 and act as the pass-through portion 122. Preferably, the front layer 226 is a transparent or translucent layer or includes a transparent or translucent portion forwardly of the light sources 206, which can include a laminate, coating, layer, or the like and can be applied, such as dipped, laminated, spray-painted, or the like, across a front surface 228 of the cross-frame member 204. Alternatively, the front layer 226 can be composed of a flowable and transparent or translucent material, such as a paint or lacquer. When deposited into the cavity 214 and, if desired, across at least a portion of the front surface 228, the flowable material can at least partially fill the cavity 214 and surround or enclose the light source 106. In this form, the flowable material can harden to secure the light source 106 within the cavity 214, and/or act as the pass-through portion 122. The front layer 226 can then protect and/or at least partially hide the one or more light sources 206 from view as they are completely received within the cavity 214 in the cross-frame member 204. To this end, the light source 206 is mounted in the cavity and oriented to project light through the front layer 226. The front layer 226 may also be formed such that the front surface 228 of the cross-frame member 204 is substantially unbroken, which preserves an aesthetic similar to traditional eyeglasses. Optionally, the front layer 226 may only partially cover the entire surface of the front frame, such as only covering the cavity 214.

The light sources 206 may also be canted with respect to the axis of the cross-frame member L2 and/or the temple arm member axes L1, as discussed above. Pursuant to this, the light sources 206 can be mounted to the rear layer 216 at the desired cant angle or angles or can include additional mounting structure that is configured to hold the light sources 206 at the desired angle. In the form with two or more light sources 206, each light source can be canted at a different vertical and/or horizontal angle with respect to the temple arm member axis L1. This configuration provides light forwardly of the lighted glasses 200 at a variety of angles, which allows wearers of the lighted glasses 200 to see a range of objects without having to move or tilt their head. One exemplary lighted glasses 200 includes the three light sources 206 as shown in FIG. 15, where the outer light sources 206 are canted inwardly and downwardly to illuminate a viewing area forwardly and downwardly of the cross-frame member 204 and the center light source 206 is substantially uncanted to project a light cone having a center being substantially parallel to the temple arm axis L1.

By another approach, a light modifying coating or material 230 can be applied on at least a portion of an inner surface 232 of the cavity 214. The light modifying material 230 may be reflective, such as a silver or nickel coating or a lithium silver plating or nickel lithium plating; however, other reflective coatings are also suitable. Alternatively, the light modifying material 230 may be light blocking, such as a black or other dark colored coating for blocking light projecting from the light source 206, such as into the cross-frame member 204 if composed of a light transmissive material, to prevent glare or illuminated material from distracting or annoying a wearer of the glasses.

As discussed above, when a light source is provided in the cross frame member 204, but some electric components such as a power source 233, which can be a pair of coin cell batteries, a rechargeable battery, or the like, are mounted to the temple arm member, the illuminated eyewear 200 must include a mechanism to connect the power source 233 to the one or more light sources 206 through the pivot connection between at least one of the temple arm members 202 and the cross-frame member 204.

As illustrated in FIG. 17, by one approach, separating the electrical components in the temple arm 202 from the light source 206 in the front frame 204 is achieved by providing an upper hinge 234 and a lower hinge 236 to connect the temple arm member 202 to the cross-frame member 204. The upper hinge 234 and the lower hinge 236 are utilized to provide positive and negative contacts to conduct power between the temple arm member 202 and the cross-frame member 204. In this example, a first wire 238 connects the upper hinge 234 to a positive contact 240 from the power source 232 and a second wire 242 connects the lower hinge 236 to a negative contact 244 from the power source 232. Screw fasteners 246 are utilized to pivotably secure the upper hinges 234 and the lower hinges 236 of the cross-frame 204 and the temple arm member 202. Wires in the cross-frame member 204 then electrically connect the hinges 234, 236 to the light source(s) 206 in the cross-frame member 204, such as within channels or grooves provided in or between the front and rear layers 216, 226. So configured, the power source 232 powers the light sources 206 through the pivot connections between the temple arm members 202 and the cross-frame member 204 without using exposed wires or other moving parts which can wear down with repeated usage and/or bending.

Figure 18:
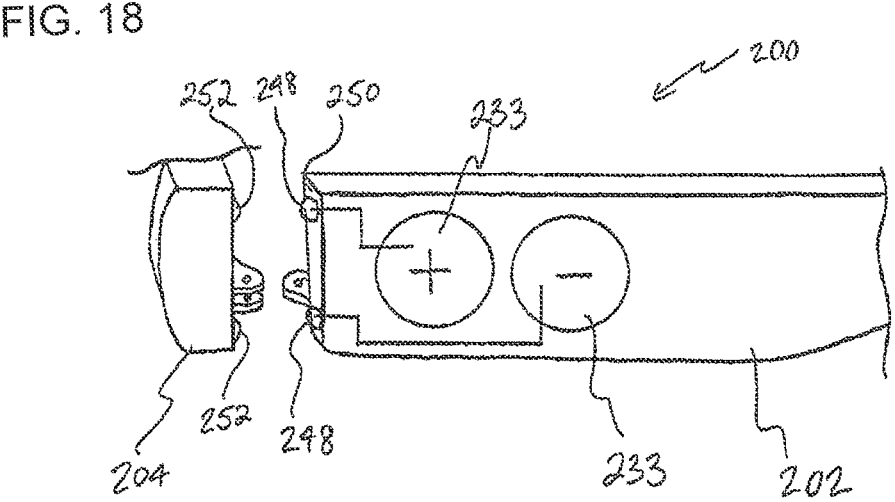
FIG. 18 is a fragmentary perspective view of illuminated eyewear showing electrical connections between a temple arm member and a cross-frame member.

By another approach as illustrated in FIG. 18, the temple arm member 202 can include an electrical contact 248 on a forward surface 250 thereof and the cross-frame member 204 can include a complementary electrical contact 252 positioned to engage the electrical contact 248 of the temple arm member 202 when the illuminated eyewear 200 is in the use or open configuration. By yet another approach, spring wire or the like can be utilized in place of the contacts 248, 252 to span electrical connections between the temple arm members 202 and the cross-frame portion 204. Similarly as described above with regard to the hinges 234, 236, wires electrically connect the contact 252 to the light source(s) 206 in the cross-frame member 204, such as within channels or grooves provided in or between the front and rear layers 216, 226.

Figure 19:
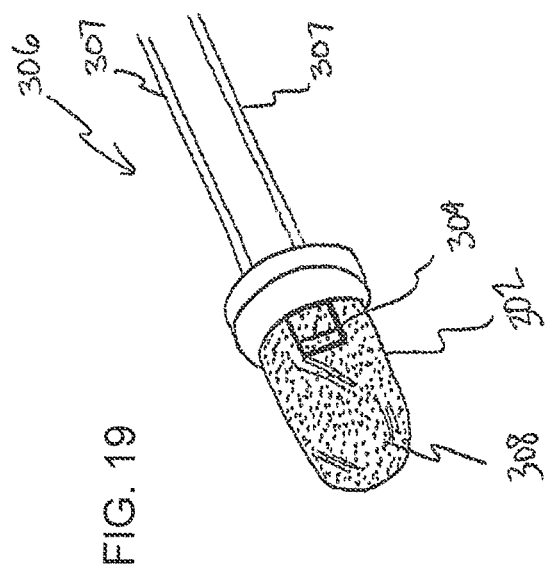
FIG. 19 is an enlarged perspective view of a LED for illuminated eyewear showing a frosted layer on the LED lens.

As illustrated in FIG. 19, an enlarged view of a modified LED 306 is shown that may be employed with the lighted eyeglasses 100 and/or 200. The modified LED 306 may be any common LED that includes a housing or lens 302 of a typical transparent material and configuration, a LED chip or diode 304 for illumination, and electrical leads 307, such as an anode and cathode lead, extending therefrom. In the illustrated form, the modified LED 306 includes a light modifying coating or surface 308 thereon. The coating may be configured to diffuse and soften the light projected from the LED 306 and can be any suitable diffusing coating, including, for example, a frosted layer, a sandblasted surface, an acid etched surface, a translucent coating, or the like. So configured, light emitted by the modified LED 306 is altered, softened, or otherwise modified by the layer 308. The light modifying coating 308 can also or alternatively be configured to mimic or resemble the color, texture, and/or general appearance of the material used to form the cross-frame member 104 and/or temple arm members 102. In another form, the coating 308 may be a refractive coating to focus or diverge the light projecting from the LED as desired. In yet another form, the coating 308 may be a wavelength or color filter or a colored coating to project a desired colored light from the LED 306.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

What is claimed is:

1. Illuminated eyewear comprising:
    a front laterally extending cross-frame portion;
    a pair of temple arm portions that have a use configuration with the temple arm portions generally extending rearwardly from the front cross-frame portion;
    front frame portions of the cross-frame portion adjacent to the pair of temple arm portions in the use configuration;
    light sources mounted to the temple arm portions adjacent to the front frame portions; and
    a pass-through portion of each of the front frame portions oriented to be forwardly of the light sources with the temple arm portions in the use configuration with the pass-through portion configured to allow light projected from each light source to project through the front frame portions forwardly of the cross-frame portion;
    wherein the cross-frame portion comprises a cross-frame member, the temple arm portions comprise temple arm members, and further comprising a pivot connection between each of the temple arm members and the cross-frame member for pivoting the temple arm members between the use configuration and a storage configuration with the temple arm members generally extending laterally adjacent to the cross-frame member, and
    wherein the pass-through portion comprises a rearwardly opening bore, the temple arm members each include a forward surface, and the light sources each are mounted to the corresponding temple arm member to include a forward portion thereof that projects forwardly beyond the forward surface of the corresponding temple arm member so that with the temple arm members in the use configuration, the forward portion of each the light sources extends into the corresponding rearwardly opening bore.

2. The illuminated eyewear of claim 1 wherein the pass-through portion comprises a cavity in the front frame portion and a cap fit in the cavity and being of a predetermined material to allow light projected from each light source to pass therethrough.

3. The illuminated eyewear of claim 2 wherein the cap predetermined material is transparent or translucent to allow light projected from the light source to pass therethrough without being refracted.

4. The illuminated eyewear of claim 2 wherein the cap predetermined material is at least one of a diffuser, refractor, color filter, wavelength filter, or tinted.

5. The illuminated eyewear of claim 2 wherein the cross-frame portion and the caps include respective front surfaces that are flush with each other.

6. The illuminated eyewear of claim 1 further comprising a light blocking member extending forwardly from the forward surface of the temple arm members adjacent to the light sources for blocking incident light from projecting through a laterally inward gap between the temple arm members and the cross-frame member with the temple arm members in the use configuration.

7. The illuminated eyewear of claim 6 wherein the light blocking member comprises an arcuate wall that at least partially wraps around the light source.

8. The illuminated eyewear of claim 6 wherein the pass-through portion rearwardly opening bore comprises a throughbore in each of the front frame portions having an enlarged rear bore portion for receiving the light blocking member therein.

9. The illuminated eyewear of claim 1 further comprising a light blocking member extending rearwardly from the front frame portions of the cross-frame member and laterally adjacent to the light sources with the temple arm members in the use configuration for blocking incident light from projecting through a laterally inward gap between the temple arm members and the cross-frame member with the temple arm members in the use configuration.

10. The illuminated eyewear of claim 1 wherein the pass-through portion comprises a layer of translucent material mounted to the cross-frame portion forwardly of the light sources.

11. The illuminated eyewear of claim 1 wherein the light sources and the pass-through portions respectively are canted inwardly and downwardly to illuminate a viewing area forwardly of the illuminated eyewear.

12. Illuminated eyewear comprising:
a cross-frame member having opposite end portions and front and rear surfaces;
temple arm members each having a forward end surface with the temple arm members having a use configuration where the forward end surfaces are adjacent the cross-frame member opposite end portions at the rear surfaces thereof and extend rearwardly from the cross-frame member for being worn by a user;
a rear opening in each of the cross-frame member end portions;
an LED having a diode mounted to each of the temple arm members and having a forward lens portion in which the diode is contained that projects beyond the corresponding temple arm member forward end surface with the forward lens portions of the LEDs fitting into the corresponding rear openings of the cross-frame member end portions with the temple arm members in the use configuration thereof; and
a front opening in each of the cross-frame member end portions in communication with the corresponding rear opening to allow light from the LEDs to travel therethrough for providing illumination forwardly of the cross-frame member,
wherein the cross-frame member and the temple arm members have pivot connections therebetween for pivoting the temple arm members from the use configuration to a storage configuration with the temple arm members generally extending along the cross-frame member, the use configuration creates a gap in an engagement area between the temple arm member forward end surfaces and the cross-frame member, and the temple arm members further comprising light blocking extensions fixed thereto laterally inwardly of the LEDs and extending forwardly away from the forward end surfaces beyond the diodes for blocking incident light from projecting through the gap with the rear openings each sized to receive the corresponding LED forward lens portion and light blocking extension therein which the corresponding temple arm member pivoted to the use configuration thereof.

13. The illuminated eyewear of claim 12 including an insert sized to fit in each of the front openings and being of nonrefractive, light transmissive material so that light from the LEDs passes through the inserts.

14. The illuminated eyewear of claim 13 wherein the insert has a front surface, and the inserts are fit in the front openings so that the front surfaces thereof are flush with the front surface of the cross-frame member.

15. The illuminated eyewear of claim 12 wherein the cross-frame member end portions each have a throughbore extending therethrough including the front and rear openings so that light from the LEDs passes through open space in the throughbores out from the front openings thereof.

16. Illuminated eyewear comprising:
a cross-frame member having opposite end portions and front and rear surfaces;
temple arm members each having a forward end surface with the temple arm members having a use configuration where the forward end surfaces are adjacent the cross-frame member opposite end portions at the rear surfaces thereof and extend rearwardly from the cross-frame member for being worn by a user;
a rear opening in each of the cross-frame member end portions;
an LED mounted to each of the temple arm members and having a forward lens portion that projects beyond the corresponding temple arm member forward end surface with the forward lens portions of the LEDs fitting into the corresponding rear openings of the cross-frame member end portions with the temple arm members in the use configuration thereof; and
a front opening in each of the cross-frame member end portions in communication with the corresponding rear opening to allow light from the LEDs to travel therethrough for providing illumination forwardly of the cross-frame member,
wherein the cross-frame member and the temple arm members have pivot connections therebetween for pivoting the temple arm members from the use configuration to a storage configuration with the temple arm members generally extending along the cross-frame member, and the rear openings are oversized relative to the forward lens portions of the LEDs to allow the forward lens portions to be pivotally fit into the rear openings as the temple arm members are pivoted from the storage configuration to the use configuration.

\* \* \* \* \*